(12) United States Patent
Hogen-Esch et al.

(10) Patent No.: US 10,586,995 B2
(45) Date of Patent: Mar. 10, 2020

(54) METHOD FOR THE FABRICATION OF HOMOGENOUS BLENDS OF POLYSTYRENESULFONIC ACID AND POLYVINYLIDENE FLUORIDE SUITABLE FOR THE APPLICATION IN DIRECT OXIDATION METHANOL FUEL CELLS (DMFCS)

(71) Applicant: University of Southern California, Los Angeles, CA (US)

(72) Inventors: Thieo E. Hogen-Esch, Los Angeles, CA (US); Ming Li, Temple City, CA (US); Surya G. K. Prakash, Hacienda Heights, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 1032 days.

(21) Appl. No.: 14/829,078

(22) Filed: Aug. 18, 2015

(65) Prior Publication Data
US 2016/0049678 A1 Feb. 18, 2016

Related U.S. Application Data

(60) Provisional application No. 62/038,497, filed on Aug. 18, 2014.

(51) Int. Cl.
| | |
|---|---|
| *H01M 8/10* | (2016.01) |
| *H01M 8/1044* | (2016.01) |
| *H01M 8/1023* | (2016.01) |
| *H01M 8/1039* | (2016.01) |
| *H01M 8/1018* | (2016.01) |

(52) U.S. Cl.
CPC ....... *H01M 8/1044* (2013.01); *H01M 8/1023* (2013.01); *H01M 8/1039* (2013.01); *H01M 2008/1095* (2013.01); *H01M 2300/0082* (2013.01)

(58) Field of Classification Search
CPC . H01M 2008/1095; H01M 2300/0082; H01M 8/1023; H01M 8/1039; H01M 8/1044
See application file for complete search history.

(56) References Cited

U.S. PATENT DOCUMENTS

| | | | |
|---|---|---|---|
| 7,803,891 B2 | 9/2010 | Goldbach et al. | |
| 2008/0242833 A1* | 10/2008 | Goldbach | B01D 67/0093 528/391 |
| 2011/0236762 A1* | 9/2011 | Huang | B29C 67/202 429/246 |

OTHER PUBLICATIONS

Gibon, C.M. et al., "Control of Morphology and Crystallization in Polyelectrolyte/Polymer Blends," Macromolecules, 2008, 41, pp. 5744-5752.

* cited by examiner

*Primary Examiner* — Adam A Arciero
(74) *Attorney, Agent, or Firm* — Brooks Kushman P.C.

(57) ABSTRACT

A membrane electrode assembly includes an anode catalyst layer, a cathode catalyst layer, and a polymeric blend proton exchange membrane interposed between the anode catalyst layer and the cathode catalyst layer. The polymeric blend proton exchange membrane includes a scaffold polymer and a polyacid polymer. The polyacid polymer being formed from a polyacid polymer precursor. Characteristically, the scaffold polymer and the polyacid polymer precursor have matching solubility parameters.

19 Claims, 11 Drawing Sheets

METHOD FOR THE FABRICATION OF HOMOGENOUS BLENDS OF POLYSTYRENESULFONIC ACID AND POLYVINYLIDENE FLUORIDE SUITABLE FOR THE APPLICATION IN DIRECT OXIDATION METHANOL FUEL CELLS (DMFCS)

CROSS-REFERENCE TO RELATED APPLICATIONS

This application claims the benefit of U.S. provisional application Ser. No. 62/038,497 filed Aug. 18, 2014, the disclosure of which is hereby incorporated in its entirety by reference herein.

TECHNICAL FIELD

The present invention is related to membrane electrode assemblies for fuel cells, and in particular, to ion-conducting membranes for fuel cells.

BACKGROUND

Alternative energy conversion technologies have attracted a great deal of attention over the years for their utility and various applications.[1-6] Among these technologies, proton exchange membrane fuel cells (PEMFCs) that combine high-energy density,[7-8] conversion efficiency[9] with versatile mobile and stationary applications,[10] and minimal emission of $CO_2$,[4] have been studied extensively.[5, 11-21]

Proton exchange membranes (PEMs) should have multiple attributes. First, the body of the membrane should have physical properties consistent with its function, for instance essential properties such as mechanical strength, toughness and flexibility. They should also be highly resistant to the highly acidic media to which they are exposed as they are expected to function for prolonged times (months to years). Furthermore, exposure to water at temperatures varying from ambient to high temperatures (150° C.) is to be expected. The permeability for water and other fuels must be controllable subject to fine tuning. For instance, buildup of water or fuels at the electrodes should be avoided so that a membrane would have to mediate with efficient water management and that of other liquid fuels such as methanol. For instance, major swelling of the membranes with water or other fuels resulting in a change of membrane properties must be avoided so that the main body of the membrane should be solvophobic. However, the electrical resistance of the membrane must be high in order to not short circuit the device, whereas the efficient permeation of hydronium ions from anode to cathode is crucial. On the other hand, the transport of methanol or other fuels from anode to cathode must be minimal. Hence, the membranes must be polymer composites with each component providing a set of desirable but largely orthogonal properties.

Among the various fuel cells, the direct methanol fuel cell (DMFC) has great potential as a stationary and portable device.[22-31] One of the key components that determine the DMFC performance is the proton exchange membrane (PEM) among which NAFION®®, a perfluorocarbon sulfonic acid copolymer, is widely used due to its high proton conductivity and good thermal stability.[32] However, NAFION® has some shortcomings in DMFC and other applications as it is prone to both spontaneous and proton mediated methanol diffusion toward the cathode ("methanol crossover") causing as much as 40 percent methanol loss.[32-33] The high cost of the NAFION® membrane (20-30% of DMFC cost) is an additional limitation.[34]

Over the past few years, the quest for higher performance (higher proton conductivities, better thermal stabilities and mechanical properties) and lower cost alternative membranes has continued.[2, 5, 9, 13, 23, 30, 33, 35-40] Recent reports have included grafting or embedding polystyrene sulfonic acid (PSSA) onto inert fluorinated polymer matrixes, such as poly(vinylidene fluoride) (PVDF), and polytetrafluoroethylene (PTFE), giving DMFC membranes with lower methanol cross-over.[33, 35, 41-44] Sulfonated hydrocarbon PEMs, including sulfonated polystyrene and its derivatives, sulfonated poly(arylene ether)s, sulfonated polyimides, and sulfonated polyphosphazenes are synthesized based on either post-polymerization functionalization such as sulfonation or direct copolymerization of sulfonated or other functionalized monomers.[40,45] Prakash et al. used a semi-interpenetrating polymer network (sIPN) by swelling PVDF membranes in styrene and divinylbenzene solution followed by an AIBN initiated polymerization and the subsequent sulfonation.[33, 46] Also, Muftuoglu et al.[41, 47] synthesized membranes based on PVDF-g-polystyrene followed by sulfonation. However, there are several major drawbacks of post-modification methods. These include the lack of reproducible control over the degree of sulfonation, the location of the sulfonate groups, the often inevitable side reactions due to more reactive sulfonation reagents and/or -conditions, and, perhaps, polymer degradation.[20] Although membranes prepared by post-polymerization sulfonation showed higher proton conductivities than NAFION® under high humidity conditions at 30-120° C., ether excessive water swelling and membrane instability at high temperatures[34,41] or mechanically deficient in the dry state and poor reproducibility emerge as new problems.[13, 23, 30, 40]

Given these requirements, successful membranes typically have a large hydrophobic content (60-90 wt. percent) but are selectively permeable, for instance, through the presence of percolating hydrophilic domains. This could be achieved using a number of synthesis methods including but not limited to: (a) copolymerization of a hydrophobic monomer and a hydrophilic comonomer that self-assemble spontaneously into hydrophilic/hydrophobic domains under varying conditions. This also includes block copolymers consisting of hydrophobic and hydrophilic blocks.[48-49] (b) A hydrophobic polymer grafted with hydrophilic chains that self-assemble under suitable conditions.[47, 50] (c) interpenetrating polymers blends through the polymerization of a precursor monomer in the bulk phase of another giving an interpenetrating network followed by the functionalization (i.e. sulfonation) to give a hydrophilic phase anchored in the bulk material.[33, 35,42] (d) Blends of carefully chosen hydrophobic and hydrophilic polymers followed by later cross-linking if required.[51-53]

The wide selection of methods and materials and low processing costs seem to make blending an attractive but challenging option. Blends from hydrophobic and hydrophilic components typically produce materials with poor properties due to the inherent incompatibilities of hydrophobic and hydrophilic polymers that typically cause the formation of large domains that, in turn, give rise to poor mechanical properties as well as poorly controlled diffusion.[54-55] Thus, direct blending of poly(sodium styrene sulfonate) (PSSNa) with PVDF or the embedded polymerization of SSNa in PVDF solution[56-57] gives highly heterogeneous and hence inferior membranes with weak mechanical strengths due to the poor PVDF-PSSA compatibility and hence phase separation at the micron level or larger giving heterogeneous materials.[56,58-59]

Proton exchange membranes (PEMs) are finding applications among other things in fuel cells using hydrogen or organic fuels such as methanol or ethanol and combine high energy densities and conversion efficiencies with minimal emission of $CO_2$. The invention set forth describes well established principles for polymer solvent interactions as a guideline for the use of binary polymer blends that are partially or fully compatible depending on the temperature. This modular design, at least in principle, is extremely versatile, flexible and potentially economical given the high cost of NAFION® membranes, the current "gold standard" for membranes in PEM fuel cells.

Accordingly, there is a need for improved proton exchange membranes formed from polymeric blends.

SUMMARY

PVDF shows excellent thermal/mechanical properties, aging resistance and superior inertness to many organic solvents, oils, and acids.[60-61] It is also more environmentally friendly than perfluorinated polymers and shows lower permeabilities to many gases and liquids,[60] including a low methanol crossover rate.[53,62-63] The properties of PVDF have prompted us to explore its use as a fuel cell membrane matrix. As PVDF and PSSA have a poor compatibility,[51-52] we reasoned that the more hydrophobic poly(tetrabutylammonium styrene sulfonate) (PBASS) should have better compatibilities with hydrophobic polymers such as PVDF. A PBASS copolymer is synthesized by a conventional radical copolymerization of tetrabutylammonium styrene sulfonate (BASS) along with small (10 mole %) amounts of styrene (S) and 4-chloromethylstyrene (CMS) for later crosslinking through electrophilic aromatic substitution. This poly (BASS-co-S-co-CMS) terpolymer is readily blended with PVDF in acetone and other solvents along with traces of a $ZnCl_2$ catalyst to give homogeneous solutions that may be cast into thin films. Heating of these films followed by ion exchange with $H_2SO_4$ and aqueous dialysis gave unprecedented transparent, homogeneous and tough PVDF-PSSA copolymer blends. Several of these membranes show exceptional properties including high proton conductivities and low methanol permeabilities compared to NAFION® 117 and similar membranes. In addition, they show promising properties as proton exchange membranes (PEMs).

In an embodiment, a membrane electrode assembly is provided. The membrane electrode assembly includes an anode catalyst layer, a cathode catalyst layer, and a polymeric blend proton exchange membrane interposed between the anode catalyst layer and the cathode catalyst layer. The polymeric blend proton exchange membrane includes a scaffold polymer and a polyacid polymer. The polyacid polymer is formed from a polyacid polymer precursor such that the scaffold polymer and the polyacid polymer precursor have matching solubility parameters.

In another embodiment, a membrane electrode assembly for incorporation into a fuel cell is provided. The membrane electrode assembly includes an anode catalyst layer, a cathode catalyst layer; and a polymeric blend proton exchange membrane interposed between the anode catalyst layer and the cathode catalyst layer. The polymeric blend proton exchange membrane includes a scaffold polymer and a polyacid polymer having formula (I) formed from a polyacid polymer precursor:

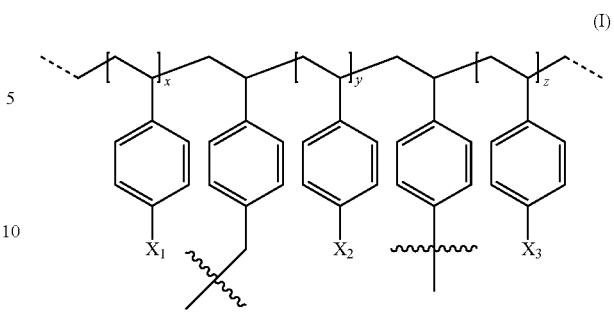

wherein:
$X_1$, $X_2$, $X_3$ are each independently a protogenic group;
x, y, z are each independently on average a number from 0 to 500;
dashed line are optional bonds to additional polymer segments;
wavy lines represent positions that are cross linked;
the sum of x, y, and z is greater than 3; and
the scaffold polymer and the polyacid polymer precursor having matching solubility parameters.

In another embodiment, a method for forming the polymeric blend proton exchange membranes set forth above is provided. The method includes a step of blending the scaffold polymer and the polyacid precursor to form a polymer blend. Characteristically, the polymer blend is homogeneous at the nm-μm scale at a first temperature. The polymer blend is then quenched by immersion into water. The polymer blend is then formed into a membrane and positioned between the anode layer and the catalyst layer to form the membrane electrode assembly for use in a fuel cell.

DETAILED DESCRIPTION

Figure 1:
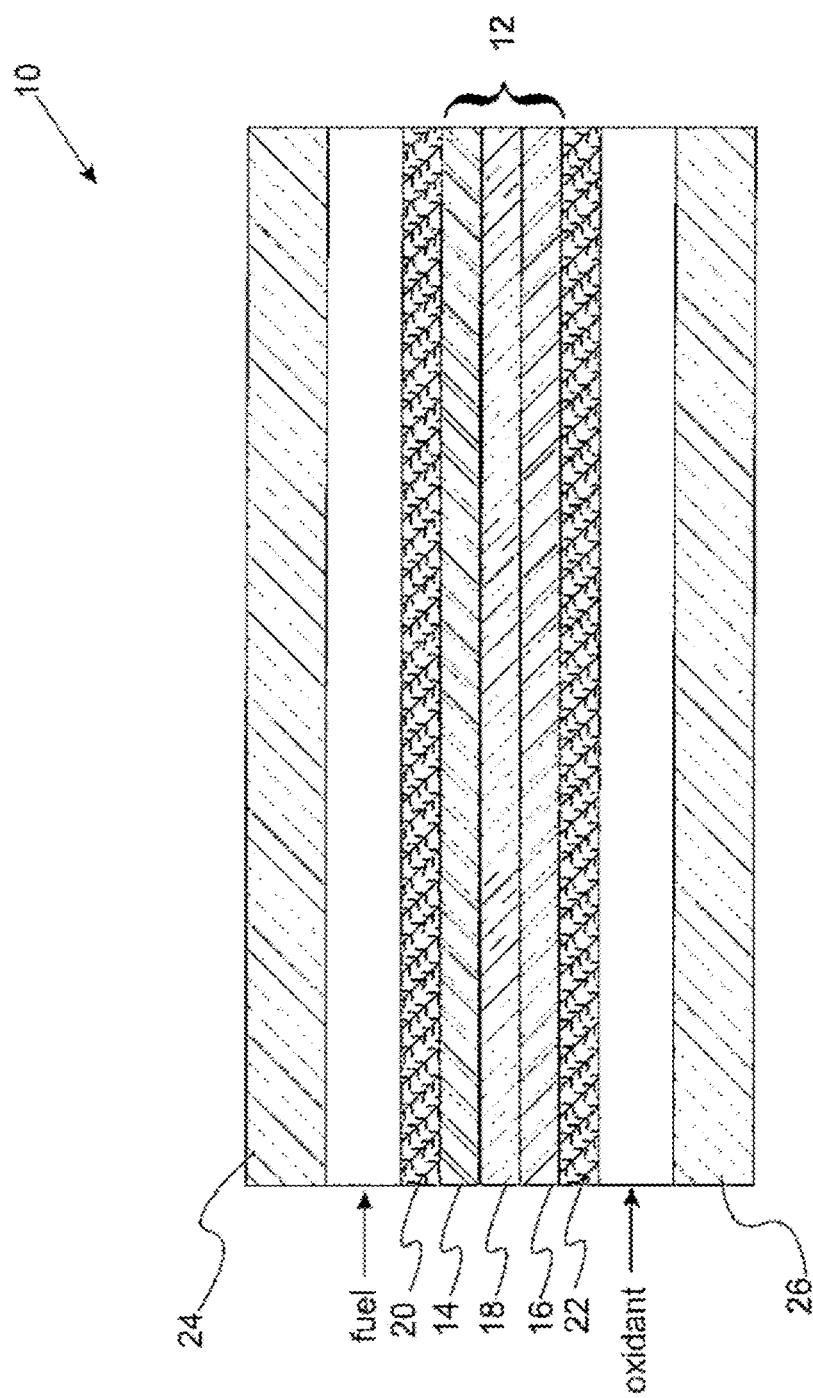
FIG. 1 is a cross-section of a fuel cell using a polymer blend sulfonic acid proton exchange membrane.

Reference will now be made in detail to presently preferred compositions, embodiments, and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weight for a polymer refers to the weight average molecular weight; "R" groups include H, $C_{1-10}$ alkyl, $C_{2-10}$ alkenyl, $C_{6-14}$ aryl (e.g., phenyl, halo, or $C_{4-14}$ heteroaryl; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

As used herein, the term "room temperature" refers to a range of about 5° C. to about 35° C. In a refinement, room temperature is 25° C.

Abbreviations

"BASS" means tetrabutylammonium styrene sulfonate;
"BAVS" means tetrabutylammonium vinylsulfonate;
"CMS" means 4-chloromethylstyrene
"DMAc" means dimethylacetamide;
"DMF" means dimethylformamide;
"DMFC" means direct methanol fuel cell
"MEA" means membrane electrode assembly;
"MPa" means megapascal;
"nm" means nanometer;
"P(TBASS-S-CMS)" means poly(tetrabutylammonium styrene sulfonate-sytrene-4-chloromethylstyrene);
"PBASS" means poly(tetrabutylammonium styrene sulfonate);
"PEEK" means tolyether ether ketone;
"PEMFC" means proton exchange membrane fuel cell;
"PEM" means proton exchange membranes;
"PSSA" means polystyrene sulfonic acid;
"PSSNa" means poly(sodium styrene sulfonate);
"Pt" means platinum;
"PTFE" means polytetrafluoroethylene;"
"Pt-Ru" means platinum-ruthenium;
"PVDF" means poly(vinylidene fluoride)
"S" means styrene;
"SPIN" means semi-interpenetrating polymer network;
"SSNa" means sodium styrene sulfonate;
"T" means temperature;
"TBASS" means tetrabutylammonium styrene sulfonate";
"TEM" means transmission electron microscopy;
"TGA" means thermogravimetric analysis; and
"µm" means micrometer.

With reference to FIG. 1, a cross-section of a fuel cell using a polymeric blended proton exchange membrane is provided. Fuel cell 10 includes membrane electrode assembly 12 which includes anode catalyst layer 14, cathode catalyst layer 16, and proton exchange membrane 18. Proton exchange membrane 18 is interposed between, and usually contacts, anode layer 14 and cathode catalyst layer 16. Advantageously, proton exchange membrane 18 includes a blend of a scaffold polymer and a polyacid polymer as set forth below in more detail. In general, the polyacid polymer is a proton conducting polymer. The scaffold polymer provides mechanical strength while the polyacid polymer provides the requisite ion (e.g., proton) conductivity. Advantageously, the scaffold polymer possesses low methanol permeability. In a refinement, the polyacid polymer forms a network of nanometer sized channels dispersed within the scaffold polymer. In a refinement, the polyacid polymer is cross-linked. Typically, membrane electrode assembly 12 is positioned between gas diffusion media 20 and 22. Fuel cell 10 also includes flow field plates 24 and 26 which have channels 28 and 30, respectively, which deliver reactants to the fuel cell active layers (i.e., the catalyst layers). During operation, a fuel (e.g., hydrogen gas, methanol, ethanol, etc.) is oxidized at the anode catalyst and an oxidant is reduced at the cathode catalyst layer thereby generating electricity.

As set forth above, proton exchange membrane 18 includes a blend of a scaffold polymer and a polyacid polymer (i.e., a proton conducting polymer). The scaffold polymer provides mechanical strength while the polyacid polymer provides the requisite ion proton conductivity. In a variation, the effective $\delta$ values (solubility parameters of the scaffold polymer and the polyacid polymer precursor) are closely matched in that a homogeneous polymer blend can be formed under practical conditions. In a refinement, the scaffold polymer has a weight average molecular weight greater than 5 k. In another refinement, the scaffold polymer has a weight average molecular weight from about 100 k to 800,00 k. In yet another refinement, the scaffold polymer has a weight average molecular weight from about 400 k to 600,00 k. In other refinements, the scaffold polymer has a weight average molecular weight greater than, in increasing order of preference, 5 k, 50 k, 100 k, 2000 k, 3000 k, or 4000 k. In still other refinement, the scaffold polymer has a weight average molecular weight less than, in increasing order of preference, 1200 k, 1000 k, 900 k, 800 k, 700 k, or 600 k. Examples for scaffold polymers include, but are not limited to, polyvinylidene chloride, polyvinylidene fluoride, poly(4-nitrostyrene), poly(2-nitrostyrene), poly(4-hydroxystyrene), poly(4-methoxystyrene), and combinations thereof. In a refinement, the polyacid polymer has a weight average molecular weight greater than 5 k. In another refinement, the polyacid polymer has a weight average molecular weight from about 5 k to 500,000K. In yet another refinement, the polyacid polymer has a weight average from 50 k to 100 k. In other refinements, the polyacid polymer has a weight average molecular weight greater than, in increasing order of preference, 5 k, 10 k, 20 k, 30 k, 40 k, 50 k, or 60 k. In still other refinement, the polyacid polymer has a weight average molecular weight less than, in increasing order of preference, 2000 k, 1000 k, 700 k, 500 k, 300 k, 100 k, or 80 k. In a variation, the polymer blend acid proton exchange membrane includes 50 to about 95 weight percent of the scaffold polymer and 50 to 5 weight percent polyacid polymer. In a variation, the polymer blend acid proton exchange membrane includes 60 to about 90 weight percent scaffold polymer and 40 to 10 weight percent polyacid polymer. In each of these weight values, the weight percent is the percent with respect to the combined weight of the scaffold polymer and polyacid polymer.

The matching set forth above matching allows the formation of homogeneous polymer blends (e.g., PBASS/PVDF polymer blends) after heating (e.g., to 150-160° C.). At that stage, the film of the polymer blend is rapidly quenched (cooled) in water (e.g., room temperature) allowing this homogeneity to be "frozen in". For example, the mobility of the PBASS polymer is very low (T above 150° C.) while that of PBASS derivatives including polystyrene sulfonic acid (PSSA) is very high. The glass transition temperature of PSSA itself is also high (~140° C.) and hence has a low mobility. However upon dialysis this polyelectrolyte is embedded in an aqueous layer and hence may well have some mobility. The subsequent exchange of the counterions (e.g., t-butylammonium ions) with the hydronium ion from $H_2SO_4$, HCl or other strong protic acids results in the formation of a thermodynamically metastable, but homogeneous, polymer blend in which the polymer salt (e.g. PBASS) is now replaced with the acid (e.g., PSSA) that has a very different, presumably much higher solubility parameter. This is followed by aqueous dialysis that now takes place without the formation of micron sized domains or larger (see TEMs in FIGS. 8 and 9). This would not be the case if the formation of PVDF-PSSA blends were to be attempted directly even at 150° C. In a refinement, the cohesive energy density ($\delta$ value) of the scaffold polymer is within 40% of $\delta$ value of the polyacid precursor polymer. In other refinements, the $\delta$ value of the scaffold polymer is within, in increasing order of preference, 40%, 30%, 20%, 10%, and 5% of 6 value of the polyacid precursor polymer. In one variation, the polyacid polymer is a polystyrene copolymer formed from salts of acid group-containing styrenes that are camouflaged with tetra-tri-, di-alkyl or similar ammonium (i.e. tetrabutylammonium) counter-ions that include hydrophobic groups (e.g., $C_{1-8}$ alkyl groups) with the acid moiety subsequently recovered by an ion exchange reaction. Other polyacid precursors lacking a phenyl ring include tetrabutylammonium vinylsulfonate (BAVS) as monomer to give (PBAVS-PVDF) homogeneous blends that can be converted via ion exchange to give homogeneous polyvinylsulfonic acids (PVSA)-PVDF blends. Also, copolymers of BASS and BAVS are possible and upon similar polymerization/ion exchange will produce the PVSA-co-PSSA/PVDF blends. Other polymerizable polyacids are accessible using similar "camouflage" methods that allow the introduction of thermodynamically unfavorable blends with PVDF and other materials polymers. Examples are vinylphosphonic acids and styrene phosphonic acid derivatives all of which may be converted into either tetra-alkylammonium, tetra-phenylphosphonium or analogous hydrophobic precursors salts. The tetraalkyl groups should be understood to encompass mixed alkyl groups such as octyltributyl, dioctyldibutyl and other combinations (for instance alkyl and aryl groups) for the ammonium and phosphonium ions. Other hydrophobic cations my include alkyl e. i. $C_{1-8}$ alkyl pyridinium or imidazolium and similar aromatic hydrophobic cations. In a variation, the polymer blend acid proton exchange membrane includes 50 to about 95 weight percent of the scaffold polymer (e.g., PVDF, etc.) and 50 to 5 weight percent of the polyacid polymer (e.g., PBASS, PSSA, etc.). In a variation, the polymer blend acid proton exchange membrane includes 60 to about 90 weight percent of the scaffold polymer and 40 to 10 weight percent polyacid polymer. In each of these weight values, the weight percent is the percent with respect to the combined weight of the scaffold polymer and polyacid polymer.

Advantageously, the scaffold polymer possesses a low methanol permeability. In a refinement, the proton conducting polymer forms a network of channels dispersed within the scaffold polymer. Given the polar character of the polyacid domains and their precursors ionic salts, scaffold polymers with relatively high solubility parameters (δ) seem most likely to be good candidates for a feasible extension to wider applications. These polymers having high δ values would include: polyvinylidene chloride (PVDC, δ=25.0 MPa$^{1/2}$), poly(4-nitrostyrene) (δ=22.7 MPa$^{1/2}$), poly(2-nitrostyrene) (δ=22.1 MPa$^{1/2}$), poly(4-hydroxystyrene) (δ=24.5 MPa$^{1/2}$), poly(4-methoxystyrene) (δ=20.2 MPa$^{1/2}$), polyvinylchloride (PVC; δ≈19-20 MPa$^{1/2}$), polyacrylonitrile (δ=25.3 MPa$^{1/2}$). As the polymers are blended this could also include step polymers such as Nylon-3, (δ=26.2 MPa$^{1/2}$) and Nylon-4, (δ=23.9 MPa$^{1/2}$). These include copolymers, the composition of which could be varied in order to fine tune the required partial compatibilities of the scaffold and proton conductor polymers.

In an embodiment, the blended proton exchange membrane includes the polyacid polymer includes a polystyrene polymer having polymer segments described by formula I:

wavy lines represent positions that are cross linked. In a refinement, the sum of x, y, and z is greater than 3. In other refinements, x, y, and z are greater than 3, 4, 5, 6, 7, 10, or 20. In a refinement, x, y, z are each independently, on average, a number from 0 to 50. In another refinement, x, y, z are each independently, on average, a number from 0 to 30. In a variation, x, y, z are each independently at least, in order of preference, 0, 1, 3, 5, 10, 20, 30, 40, and 50. In another variation, x, y, z are each independently less than or equal to, in order of preference, 500, 300, 100, 50, 40, 30, 10, 40, and 50. In another variation, $X_1$, $X_2$, $X_3$ are each independently selected from the group $SO_3H$, $PO_3H_2$, and $CO_2H$. In particular, $X_1$, $X_2$, $X_3$ are each independently $SO_3H$. In a variation, the polymer blend acid proton exchange membrane includes 50 to about 95 weight percent polyvinylidene chloride or fluoride and 5 to 50 weight percent polystyrene polymer. In a variation, the polymer blend acid proton exchange membrane includes 60 to about 90 weight percent polyvinylidene chloride or fluoride and 10 to 40 weight percent polystyrene polymer.

In a variation, the polystyrene polymer includes cross-linked polymer segments having formula II:

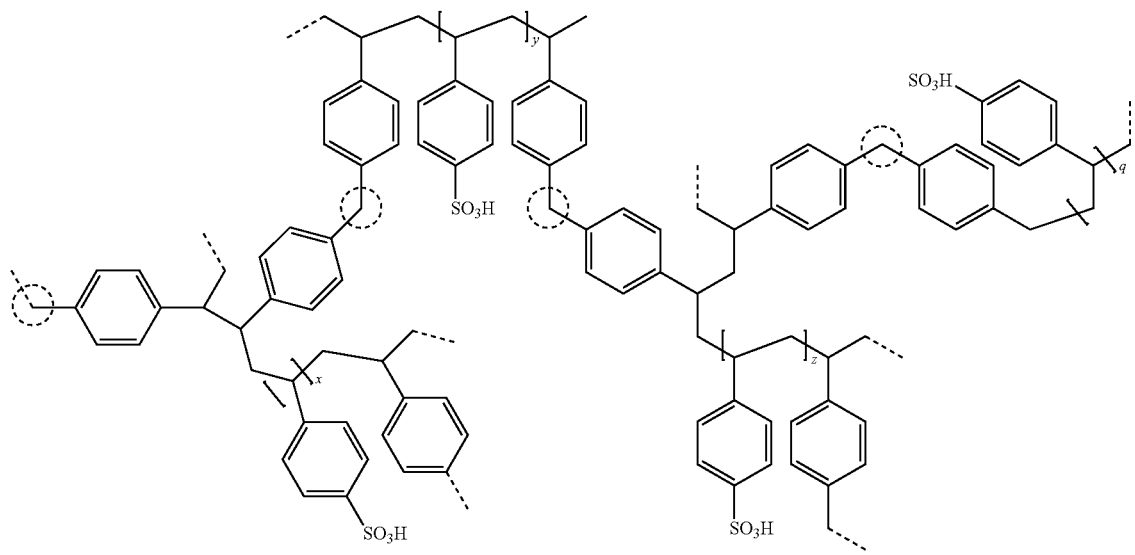

II

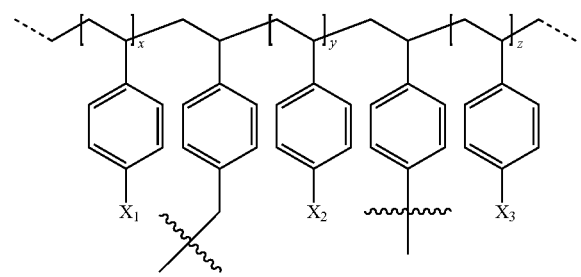

I wherein:
$X_1$, $X_2$, $X_3$ are each independently a protogenic group;
x, y, z are each independently on average a number from 0 to 500;
dashed line are bonds to additional polymer segments; and wherein:
x, y, z, q are each independently a number from 0 to 500;
dashed lines are bonds to additional polymer segments or components; and
dashed circles are cross linked positions. In a refinement, the sum of x, y, z, and q is greater than 3. In other refinements, x, y, z, and q are greater than 3, 4, 5, 6, 7, 10, or 20.

In another embodiment, a method for forming the polymeric blend proton exchange membranes set forth above is provided. The method includes a step of blending the scaffold polymer and the polyacid precursors (e.g., polymer having segments VI) to form a polymer blend. Typically, the first temperature is from 140° C. to 150° C. In a refinement, the first temperature is greater than or equal to, in increasing order of preference 100° C., 110° C., 120° C., 130° C., 140° C., or 150° C. In another refinement, the first temperature is less than or equal to, in increasing order of preference 200° C., 190° C., 180° C., 170° C., 160° C., or 150° C. Characteristically, the polymer blend is homogeneous at the nm-μm scale at a first temperature. The polymer blend is then quenched by immersion into water at a second temperature. The second temperature (e.g., 1 to 80° C. or room temperature) is lower than the first temperature. In a refinement, the polymer blend is acidified to ensure that counter-ions are replaced by protons. The polymer blend is then formed into a membrane and positioned between the anode layer and the catalyst layer to form the membrane electrode assembly for use in a fuel cell as depicted in FIG. 1.

In a variation, a method for making the blend of a scaffold polymer and a proton conducting polymer set forth above is provided. The method includes a step of copolymerizing monomers having formulae III, IV, and V to form a polystyrene copolymer (i.e., a polyacid polymer or salt thereof):

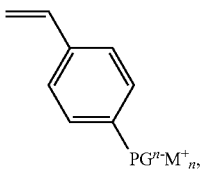

III

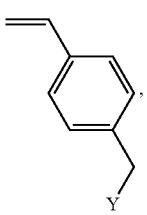

IV

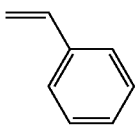

V wherein:
PGb$^{n-}$M$^+_n$ is salt of a protogenic group. For example, PG$^{n-}$ is SO$_3^-$, PO$_3^{2-}$, and CO$_2^-$, M$^+$ is a counterion, and n is 1 or 2; and Y is a halogen (e.g., Cl, Br), mesylate or tosylate. Suitable counterions include NR$_4^+$ and PR$_4^+$ where R is C$_{1-8}$ alkyl (e.g., methyl, ethyl, n-propyl, isopropyl, t-butyl, n-butyl, sec-butyl).

In a refinement, the copolymerization includes 60 to 99 molar percent of the monomer having formula III, 0.5 to 20 molar percent of the monomer having formula IV, and 0.5 to 20 molar percent of the monomer having formula V. In another refinement, the copolymerization includes 60 to 90 molar percent of the monomer having formula III, 5 to 20 molar percent of the monomer having formula IV, and 5 to 20 molar percent of the monomer having formula V. The polystyrene copolymer includes polymer segments having formula VI:

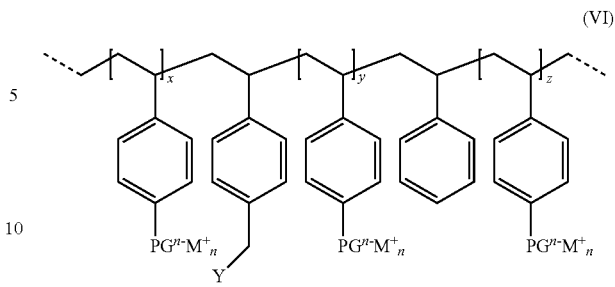

(VI)

where x, y, z, PG, n, and M are as set forth above. The polystyrene copolymer is combined with a polyvinylidene chloride or fluoride. The polystyrene copolymer is then cross-linked by a Lewis acid catalyzed electrophilic aromatic substitution reaction in an aprotic solvent at temperatures between 60 and 150° C. The polystyrene copolymer is acidified in order to replace the M groups with protons. The resulting polyvinylidene-polystyrene sulfonic acid copolymer blends are then formed into a fuel cell membrane (e.g., by casting).

Discussion.

Polymer Solutions.

The solubility of a polymer (2) in a given solvent (1) is lower than the corresponding monomers as a gain in the positive entropy of mixing ($\Delta S$) tends to be small (smaller numbers of polymer molecules per unit volume) compared to the unfavorable heat of mixing ($\Delta H$) that is related to the difference in their solubility parameters, $\delta$, by the relationships:

$$\Delta H = V(\delta_1 - \delta_2)^2 \phi_1 \phi_2 \quad (1)$$

$$c^{1/2} = (\Delta E/V)^{1/2} = \delta \quad (2)$$

where $\phi_1$ and $\phi_2$ ($=1-\phi_1$) are the corresponding volume fractions and where c, or cohesive energy density, represents the energy of vaporization in calories per cubic centimeter and is a direct reflection of the van der Waals (and other) forces holding the molecules of the liquid or substance together. The corresponding Hildebrand solubility parameters $\delta_1$ and $\delta_2$ (eqn. 2) are expressed in cals$^{1/2}$·cm$^{-3/2}$ or in MPa$^{1/2}$. The more current version of the solubility parameter $\delta(SI)$ is expressed in units of square root of mega Pascal (MPa)$^{1/2}$, the two parameters being related by:

$$\delta(MPa^{1/2}) = 2.0455 \times \delta(cal^{1/2} cm^{-3/2}). \quad (3)$$

The $\delta$ values are known for many solvents but for fewer polymers, indirectly, through physical measurements. [Brandrup J, Immergut E. H., Grulke, E. A., Bloch, D., Editors. Polymer handbook. 4$^{th}$ Ed. New York: Wiley-Interscience, 1999. VII, 675-738]. When the difference in solubility parameters, and thus $\Delta H$, is small compared to the thermal energy (RT) polymer and solvent are miscible in all proportions.

Polymer Blends.

The occurrence of true polymer mixing has an even lower entropy of mixing so that true polymer blends are far less common. A quantitative description of binary polymer blends is less simple. However, eqn-1 is still relevant it can be inferred that blending is promoted when the two polymers having comparable solubility (or cohesion) parameters. [L. M. Robeson, "Polymer Blends. A Comprehensive Review" Carl Hanser Verlag GmbH & Co. KG, 2007, Ch 2, pp 11-64.]

Depending on the difference of these parameters, certain binary polymer blends may form, for instance by dissolution of the polymers in a common solvent, followed by complete solvent evaporation and heating if needed. The extent of mixing (blending) following basic thermodynamics is determined by both the enthalpy ($\Delta H_m$) and entropy of mixing ($\Delta S_m$) and the Kelvin temperature, T. In the following, the solubility parameter $\delta$ ($MPa^{1/2}$) will be used but only in a qualitative manner as the exact magnitudes of the $\delta(SI)$ values of the polymers referred to in this invention have not been determined or cannot yet be reliably calculated. However the values of some common polymers are known or have been determined by various methods. (Brandrup J, Immergut E. H., Grulke, E. A., Bloch, D., Editors. Polymer handbook. $4^{th}$ Ed. New York: Wiley-Interscience, 1999. VII, 675).

Phase Separation of Polymer Blends.

In some partially miscible polymer blends the phase diagram looks like that of the corresponding partially miscible liquids with an upper critical temperature, $T_c$. It has been shown, however, that binary polymer blends can have both upper and lower critical temperatures, [L. M. Robeson, "Polymer Blends. A Comprehensive Review" Carl Hanser Verlag GmbH & Co. KG, 2007, Ch 2, pp 11-64.] in the present case we will restrict any claims to upper critical temperatures. Like the corresponding solvents, above the "critical temperature" ($T_c$) such a binary polymer pair is miscible in all proportions and would form a true homogeneous, fully compatibilized, blend in which the two polymers are dissolved at the molecular level. At a temperature just below $T_c$, the compositions of the two phases are slightly different and become more so at lower temperatures. For such a case in which $\phi_1 > \phi_2$ the dominant polymer (1) tends to form a continuous phase in which the polymer (2) is dispersed in the form of polymer clusters of small variable size and composition.

Polymer Blends as Membranes.

The present invention uses NAFION® including its well documented hydrophilic/hydrophobic domain structure as a model for an effective blend-based PEM. In this case there is controlled separation of a major hydrophobic "scaffold" polymer and a minor hydrophilic phase that mediates proton conduction through small diameter (nm sized) "channels" that percolate the membrane scaffold that provides the required mechanical properties and is not degraded by strong aqueous acid or oxygen at operating temperatures that are can exceed 100° C.

A number of requirements must be met in order for polymer blend based PEMs in order to function efficiently as fuel cell membranes. The first is incorporation of a proton conducting polymer into the membrane "scaffold" polymer both having low methanol permeation properties. The properties of each polymer component in the blend must be deployed most effectively. Thus, the body of the membrane should have the required physical properties such as mechanical strength, toughness and flexibility. Like NAFION® both polymer components should be resistant to acids, oxygen in the form of air or $O_2$ and water at temperatures varying from ambient to high temperatures (>100° C.). True-molecular-level-homogeneous blends would defeat these objectives of the two phases with different functions, compromising both. For instance the proton conductance would be severely reduced by the presence of a large fraction of the non proton conducting and low dielectric constant ($\varepsilon$=8.4) PVDF. On the other hand large scale phase separation would also compromise both materials and proton conductor properties. For instance the excellent mechanical properties of PVDF have been shown to be diminished by the presence of other large isolated ionic and/or hydrophilic polymer domains. The proton conductance of such membranes in which large PSSA domains ("islands") are dispersed into a non conducting continuous PVDF matrix should be very low. This is in sharp contrast with the proton conductance data (FIG. 4) that show robust proton conductivities. Hence the formation of small PSSA clusters is anticipated to be present in preferably elongated domains as the polymers themselves are expanded due to an ionic repulsion driven polyelectrolyte expansion. This is also consistent with the TEM data.

Synthesis of Homogeneous PVDF-PSSA Blends.

Blending of polystyrene sulfonic acid (PSSA) and polyvinylidenefluoride (PVDF) as a model for NAFION® has been tried but predictably has failed as the solubility parameters of PSSA and PVDF are very different given the very high boiling points and hence large $\delta$ values of p-toluenesulfonic acid (140° C./20 mmHg) a model monomer for styrene sulfonic acid. Similar attempts to synthesize these blends from sodium polystyrene sulfonate were also unsuccessful. However, indirect methods through impregnation of PVDF with styrene, divinylbenzene and AIBN followed by radical styrene polymerization-crosslinking gives an interpenetrating PSSA-PVDF network. However, subsequent harsh sulfonation conditions using sulfuric acid or chlorosulfonic acid followed by dialysis gave brownish brittle membranes with unsatisfactory mechanical properties. Other attempts through sulfonation of a variety of precursors were made but did not have the desired properties As PVDF and PSSA have a very poor compatibility,[51-52] it is reasoned that the more hydrophobic poly(tetrabutylammonium styrene sulfonate) (PBASS) should have better compatibilities (lower $\delta$ value) with polymers such as PVDF ($\delta$=23.2 $MPa^{1/2}$) due to introduction of the highly hydrophobic ($Bu_4N^+$) into the PSSA. The required tetrabutylammonium styrene sulfonate (TBASS) monomer is readily synthesized by the reaction of styrene sulfonic acid with tetrabutylammonium hydroxide or similar organic bases. Furthermore the strong cohesion of the styrene sulfonic acids due to intermolecular H-bonding is eliminated contributing to an even lower $\delta$ value and hence an increased leverage that can be used to tune the $\delta$ value of the proton conducting polymer component.

PBASS (co)polymers are readily synthesized by a conventional radical copolymerization of (TBASS) along with small (10 mole %) amounts of styrene (S) and 4-chloromethylstyrene (CMS) for later crosslinking through electrophilic aromatic substitution (see below). The PBASS homopolymer is compatible with PVDF as well. The poly (BASS-co-S-co-CMS) terpolymer is readily blended with PVDF in acetone and other solvents along with traces of a $ZnCl_2$ catalyst that mediates electrophilic aromatic substitution of the S and CMS units to give optically clear solutions that are assumed to be homogeneous and are then cast into thin films. Slow heating of these films to about 150° C. followed by rapid quenching in water followed by ion exchange with $H_2SO_4$ and extended aqueous dialysis gave unprecedented transparent, homogeneous and tough PVDF-PSSA copolymer films. It is not clear that the optically clear solutions are true ideally mixed binary blends. Thus they may represent nanometer sized domains of the proton conductor polymer that still contains PVDF (see below). It is of interest to note that slow cooling of the PBASS-PVDF blends renders the films opaque indicating phase separation at the micron level thus confirming this system as a binary polymer blend with an upper critical temperature. This also indicates that the compositions of the two phases below $T_c$ differ in composition in that each polymer is present in the two phases (see below).

PVDF-PSSA Blend Properties.

It can be said that the optically clear blends are possible through the "camouflage" of sulfonate polymer by the tetrabutylammonium sulfonate salts. The use of tetra-octyl ammonium styrene sulfonate instead of TBASS also results in the formation of homogeneous PVDF-PSSA blends whereas the use of tetra-methyl ammonium styrene sulfonate gives less satisfactory results. This indicates considerable flexibility in fine tuning of the styrene sulfonate solubility parameters with that of other polymer scaffolds.

In the absence of crosslinking (no $ZnCl_2$) and similar workup the PSSA is slowly leached out of the PVDF membrane confirming the importance of crosslinking in membrane stability. The high proton conductances depend linearly on PSSA content whereas methanol diffusion as a function of PSSA content shows an interesting sigmoidal pattern indicating different mechanisms for proton and methanol diffusivities. The onset of methanol diffusion above about 10-15 wt percent PSSA suggests the presence of percolating hydrophilic channels consistent with TEM analysis of the PSSA Pb salts of the M20 and M30 membranes (see, FIGS. 8 and 9). The desirable properties and the two-dimensional patterns of the PSSA domains indicated by the data suggest the presence of a three dimensional network of interconnected percolating channels.

The PBASS copolymer/PVDF blends upon exposure to water and ion exchange remain optically homogeneous. This is remarkable given the transformation of the PBASS into the PSSA copolymer the increased differences in δ parameters between PSSA copolymer and PVDF the formation of larger PSSA domains is predicted but this does not occur given the data. Instead the domains seem to self-assemble plausibly increasing the connectivity of the hydrated PSSA network. It would appear that the blends are "frozen in" through the low mobility of the PSSA copolymer networks given the high glass transition temperatures (Tg) of the PSSA chains and their hyper-branching and crosslinking. Furthermore, the swelling by water adds about 10-12 water molecules per sulfonic acid unit and the resulting ionic intra- and inter-molecular repulsion of sulfonate anions is expected to expand the PSSA domains longitudinally thus contributing to an even distribution of the PSSA units distributed along hydrophilic channels. Several of these membranes show exceptional properties including high proton conductivities and low methanol permeabilities compared to NAFION® 117 and similar membranes. Also methanol crossover values measured in DMFCs are much lower than the corresponding NAFION® values (see, Figures-17 and 18).

Advantages.

Key advantages of using binary blend based PEM membranes are: (A) the independent control of both components using a modular approach. Thus, one component gives an acid stable scaffold with the required mechanical properties while the polymer acid provides for proton transport while controlling undesirable methanol. This modular approach, in turn, carries a number of further advantages. (B) The molecular weight (MW) of either the polymer scaffold of the proton or other ion conductors can be changed independently. (C) The IEC and proton conductivity can be adjusted by simply varying the fractions of the two polymer components without redesigning the membrane and gives better reproducibilities as shown above (FIG. 7). (D) The copolymerization of BASS or analogous polymerizable ionic monomers under mild conditions helps to avoid side reactions resulting from aggressive sulfonation or other reaction conditions. (E) The inclusion of a wide variety of polymerizable monomers such as t-butylammomium vinylsulfonate or other hydrophobically modified polymerizable acids is of interest in the optimization of the membranes. (F) Crosslinking is controlled separately from polymerization through (a) the addition of suitable crosslinking comonomer(s), (b) molar content of the crosslinking comonomers, (c) the type and concentration of Lewis acid (i.e. $CuCl_2$, $ZnCl_2$, $FeCl_3$ $AlCl_3$ or other Lewis acid) and (d) crosslinking temperature. F. The extension of this modular approach to other membranes or polymer catalysts is feasible.

The following examples illustrate the various embodiments of the present invention. Those skilled in the art will recognize many variations that are within the spirit of the present invention and scope of the claims.

Experimental Section

All reagents were purchased from Aldrich and used as received. Tetrabutylammonium styrene sulfonate (BASS) was prepared from sodium styrenesulfonate (SSNa) and tetrabutylammonium hydroxide ($Bu_4NOH$) (or $Bu_4NCl$) by aqueous ion exchange.[64] Thus, 5 grams (24.2 mmoles) of SSNa dissolved in 50 ml deionized water was placed in a 250 ml round bottom flask, and 16.1 ml of 40 wt. percent $Bu_4NOH$ (or $Bu_4NBr$/$Bu_4NCl$) (24.2 mmols) was added drop wise with stirring at room temperature. The solution became cloudy and was stirred for an additional 10 min. The BASS was extracted with 100 ml of $CH_2Cl_2$ and the solution was dried overnight over anhydrous $MgSO_4$. Evaporation under vacuum gave a light yellowish viscous liquid (10.1 g) in 98 weight percent yield. Proton NMR was used to verify the structure of ionic liquid monomer BASS.

Terpolymerization of
BASS-styrene-4-chloromethylstyrene (CMS)
Poly(BASS-S-CMS)

The copolymerizations were carried out by adding 5 g (11.7 mmols) of BASS, 0.153 g (1.47 mmols) of styrene, 0.224 g (1.47 mmols) of CMS, 21 mg (0.131 mmols) of 2,2'-azobis-(isobutyronitrile) (AIBN) and 5 ml 1,2-dichloroethane to a dry 50 ml round bottom flask purged with argon. The system was then degassed and refilled with argon three times. The polymerization was started by heating at 65° C. while stirring. After 10 h, the reaction mixture was diluted with 20 ml dichloromethane and precipitated into 400 ml anhydrous THF at room temperature. Poly(SSTBA-S-CMS) (91% yield) was obtained by drying the copolymer in a vacuum at 50° C. for 24 h.

Synthesis.

To a 50 mL round-bottom flask, 1.575 g (20 wt. %) of the poly (BASS-S-CMS) and 2.425 g poly(vinylidene fluoride) (PVDF) powder (MW=534 k) were dissolved in 25 mL of N,N-dimethylformamide (DMF) and heated to 60° C. in order to give a homogeneous mixture. After cooling to 25° C., 2 ml of a 1 wt. % DMF solution of $ZnCl_2$ (0.25 mmoles) was added slowly and the mixture was allowed to stir at room temperature for 15 minutes until the solution was homogeneous. The mixture was then poured into 10 cm diameter petri dishes and transferred to a oven followed by incremental heating to 150° C. over a period of 1 h and heating at that temperature for another 2 hours in order to induce the $ZnCl_2$-mediated crosslinking of the benzyl chloride and phenyl groups.[65-68]

Scheme 1. Synthesis of poly (BASS-co-S-CO-CMS) and subsequent crosslinking. Corrected scheme is included.

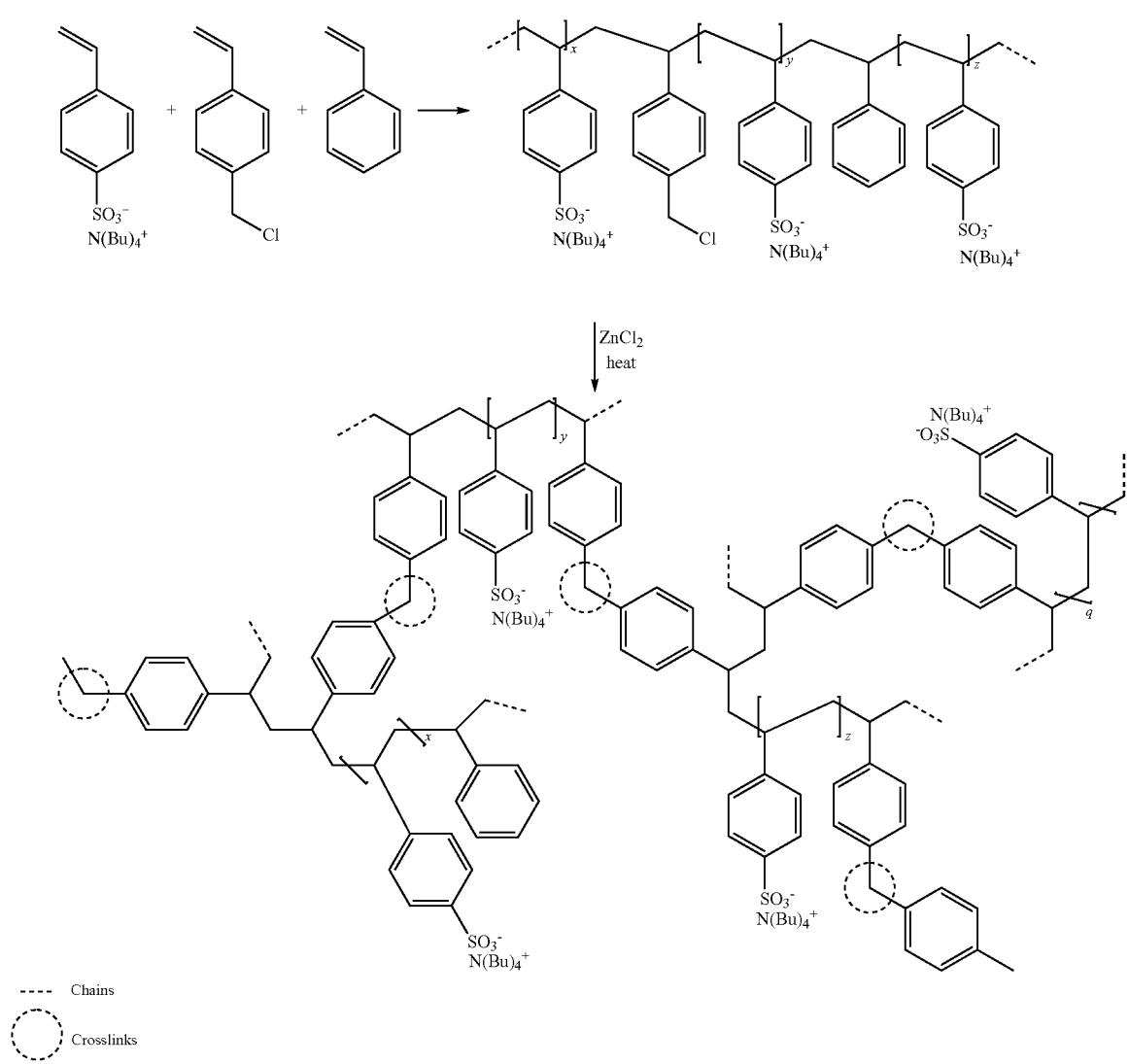

After removal from the oven, the membrane was quickly immersed in deionized water for 3 h and retrieved from the Petri dish. The resulting PSSA-PVDF membrane was soaked in 1 L 1M $H_2SO_4$ solution and heated to 95° C. for 72 h in order to obtain the corresponding polystyrene sulphonic acid composite (PSSA-PVDF) through ion exchange. After acidification, the membrane was further dialyzed with 500 ml-deionized water at 80° C. for 3 days, and the deionized water was replaced every 12 hours in order to eliminate residual $H_2SO_4$ and $ZnCl_2$. The absence of chloride was confirmed by boiling the membrane in 10 ml of water for 2 hrs and titration of the resulting solution with $AgNO_3$ that gave no observable precipitate. The absence of elution of P(SSA-S-CMS) from the PVDF matrix was confirmed by boiling the membrane in dichloromethane for 2 hrs followed by drying. No loss of mass was observed, indicating effective crosslinking. In contrast in the absence of crosslinking, significant loss of PSSA was observed. Finally the PSSA-PVFD membranes were dried at 60° C. for 24 h under the vacuum. The dry PSSA/PVDF membranes are homogeneous, colorless, flexible, and extremely tough. When annealed at 150° C., the membranes are completely transparent (see FIG. 2). The transparency of the dry membrane indicates that the PSSA copolymer domains must be quite small relatively small (<0.1μ), which is consistent with exploratory SEM measurements.

Characterization.

Methanol Permeation Measurements.

Gas chromatography (GC, Thermo Trace 2000 GC) was used to monitor the methanol permeability.[69-70] A two-compartment apparatus was used containing one compartment ($V_A$=200 ml) filled with a 2.0 M aqueous methanol solution and 1-butanol (0.1 mM as internal standard) in deionized water. The other compartment ($V_B$=200 ml) contained a 1-butanol (0.1 mM) solution in deionized water. A rectangular membrane with a diffusion area of 4.52 $cm^2$ was clamped between the two compartments, and methanol permeation across the membrane was measured during which the two-solutions were being stirred. The reservoirs were sufficiently large so that pseudo steady-state condition prevailed. Thus, the methanol concentration in compartment A was constant and the concentration of methanol in the receiving compartment as a function of time can be given by:

$$V_B \frac{dC_B}{dt} = A \frac{DK}{L} C_A \quad (1)$$

$$C_B(t) = \frac{A}{V_B} \frac{P}{L} C_A (t - t_0) \quad (2)$$

where $C_A$ and $C_B$ are the concentrations (mol/L) in the two compartments, A and L the membrane area and membrane thickness in cm's respectively. D and K are the methanol diffusivity and partition coefficient between the membrane and the solution in compartment B respectively. Equation (3) can be solved to give where P (=D·K) is the membrane methanol permeability. The parameter, $t_0$, also termed time lag, is explicitly related to the diffusivity: $t_0 = L^2/6D$. The concentration of methanol $C_B$ in the reservoir was continuously monitored by a gas chromatography (GC) and measured as a function of time and the permeability was calculated from the slope of the straight line plot of methanol concentration versus permeation time in the FIG. 5.

Ion Exchange Capacity (IEC).

All PBASS-PVDF membranes were soaked in 500 ml 1M $H_2SO_4$ solution for 48 h at 95° C. and after exchange with a fresh 1M $H_2SO_4$ solution for an additional 24 hrs in order to convert the BASS- to SSA-units. The resulting membranes were soaked in 500 mL distilled water for 3 days at 80° C. with the distilled water being replenished every 12 h. Prior to measuring the ion exchange capacity (IEC) the membranes were placed in a saturated NaCl solution for 24 h. The proton concentration in the supernatant solution was then determined by titrating with 0.01 M NaOH solution using phenolphthalein as indicator. The IECs of typical membranes are listed in Table-3. The IEC (mmol/g) of the membrane was determined from: IEC=($V_{NaOH}$·$C_{NaOH}$)/$W_{dry}$ where $V_{NaOH}$ and $C_{NaOH}$ are the volume (ml) and molar concentration, respectively, of the NaOH solution and $W_{dry}$ is the mass of dry membrane.

Mechanical Properties.

The mechanical properties of the various membranes were determined from tensile testing. Samples for the tensile test were prepared by cutting the membrane into dumbbell shape specimens in accordance with the ASTM D 882-12 and were full hydrated before testing. The tensile test was performed using a 500 N tensiometer, (Universal Tensile Testing Machine, Instron 5900) at a crosshead speed of 25 mm/min at room temperature. At least five specimens were tested for each sample, and the average values of tensile strength, maximum elongation at break, and Young's modulus were reported.

Proton Conductivity.

The proton conductivity of membrane samples was determined by an electrochemical impedance spectroscopy (EIS) using an impedance/gain-phase analyzer (Solartron 1260) in combination with an electrochemical interface (Solartron 1287). A homemade "four probe" apparatus similar to that described by Cahan and Wainright[71] was employed to measure the proton conductivity. The proton conductivity σ (S cm$^{-1}$) was calculated using:

$$\sigma = \frac{L}{R \cdot A} \quad (3)$$

where L (cm), A (cm$^2$) and R (Ω) represents the distance between the two inner Pt-probes, cross-sectional area of the membrane, and resistance, respectively.

Transmission Electron Microscopy.

TEM observation was performed on a JEOL JEM-2100F TEM at an accelerating voltage of 200 kV. The membrane samples were immersed in saturated $Pb(NO_3)_2$ aqueous solution for 2 days to stain the PSSA domains. The films were then washed with deionized water and dried for 24 h in a vacuum oven at 80° C. The stained membranes were embedded in an epoxy resin (Low Viscosity Embedding Media Spurr's Kit, Spurr Co, PA) and cut into TEM specimens with a Leica EM UC6 Cryo-Ultramicrotome.

Scanning Electron Microscope (SEM) and Energy-Dispersive X-Ray Spectroscopy (EDS).

The surface and cross-section of the modular membrane were observed by means of a scanning electron microscopy (JEOL JSM-7001). The distribution of various elements on the surface was investigated with corresponding energy-dispersive X-ray spectroscopy (EDS). Samples of the modular membrane were coated with a thin layer of gold using a sputter coater (Cressington) before imaging.

Thermal/Chemical Stability Analysis.

The thermal degradation of polymer blend films was studied with thermogravimetric analysis (TGA) using a DuPont 2000 differential scanning calorimeter. The samples were heated up to 800° C. in air. The oxidative stability was tested by soaking a small piece of well-dried membrane in Fenton's reagent (3% $H_2O_2$+2 ppm $FeSO_4$)[72] at room temperature and monitoring the crack formation.

Water Uptake Measurements.

The water uptake of the membrane was measured by soaking the samples overnight in water at 25° C. The samples were removed from the water, any excess surface water wiped off using dry filter papers and weighs ($W_{wet}$) was measured. The water uptake, $\Phi_w$, defined by:

$$\Phi_W = \frac{W_{wet} - W_{dry}}{W_{dry}} \times 100\% \quad (5)$$

where $W_{wet}$ and $W_{dry}$ are the weights of swollen and of dry membranes respectively.

Membrane Electrode Assembly (MEA) Fabrication.

Membrane electrode assembly is a key part of a PEM fuel cell. The fabrication methods generally focus on catalyst loading and strong binding between the catalyst layer and membrane surface. The fabrication of MEA involves "painting" a catalyst ink onto Teflon-impregnated porous carbon paper and subsequent hot pressing carbon electrodes with polymer electrolyte membranes.[73] The catalyst ink consists of Platinum black (Pt) or Platinum-Ruthenium (Pt-Ru), NAFION®-H ionomer (5 wt. % solution dispersed in lower alcohols) and deionized water (DI $H_2O$).

TABLE 1

Anode and cathode catalyst ink composition for 25 cm$^2$ MEA.[b]

| Electrode | Catalyst/g | NAFION ®-H[a]/g | DI $H_2O$/g |
|---|---|---|---|
| Anode | 0.2 g Pt—Ru | 0.2 g | 0.8 g |
| Cathode | 0.2 g Pt | 0.2 g | 0.8 g |

[a]5% NAFION ®-H ionomer solution with 1100 equivalent weight.
[b]catalyst ink was painted on carbon paper using hand brushing method.

The composition of catalyst inks is shown in Table 1. The catalyst ink was then painted onto teflon-coated 2"×2" carbon paper sections (25 cm²) that were hot-pressed (500 psi) onto the DMFC membranes at 100° C. for 25 min. Results.

Copolymerization of BASS.

As indicated above BASS need to be crosslinked in order to prevent leaching from the matrix during use in aqueous media. This process needs to occur when dissolved in the hydrophobic matrix as the crosslinked PBASS is not soluble in PVDF or in any other polymer domains. Herein, the AIBN initiated copolymerization of the "camouflaged" BASS, styrene and 4-chloromethylstyrene (CMS) in 1,2-dichloroethane or similar solvents gave facile copolymerizations in good yields (Table-2), providing the corresponding terpolymers with thermal cross-linkable functionality. The crosslinking of the chloromethyl group and the styrene units, or for that matter the CMS units, can occur through Lewis acid catalyzed electrophilic aromatic substitution reactions under a wide a wide variety of conditions (Scheme-1).

TABLE 2

Terpolymerization of tetrabutylammonium styrene sulfonate (BASS), styrene (S) and 4-(chloromethyl)-styrene (CMS).[a]

| Polymer | BASS (mol %) | S (mol %) | CMS (mol %) | $DP_w$[b] | Yield (wt. %) |
|---|---|---|---|---|---|
| P1 | 80 | 10 | 10 | 382 | 90 |
| P2 | 90 | 5 | 5 | 409 | 93 |
| P3 | 70 | 15 | 15 | 376 | 91 |

[a]AIBN as initiator, in 1,2-dichloroethane at 65° C. for 10 h.
[b]Determined by dynamic light ccattering (DLS) in 0.1M aqueous NaCl.

Membrane Synthesis.

The membranes were synthesized by mixing dimethylformamide (DMF) or dimethylacetamide (DMAc) solutions of PVDF, poly (BASS-S-CMS) terpolymer and a trace of zinc chloride at room temperature giving homogeneous solutions that were poured into glass molds.

Figure 2:
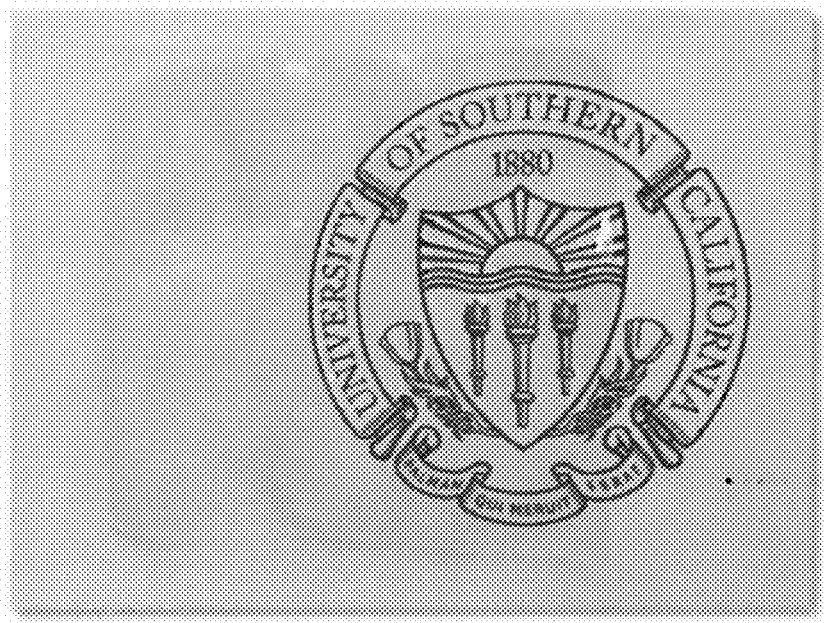
FIG. 2. Photograph of (PSSA copolymer)-PVDF membrane M20.

The ratios of these two components were adjusted to give membranes with polystyrene sulfonic acid (PSSA) contents between 10 and 35 wt. percent. The polymer blend membranes was annealed at 150° C. for 2 h in order to evaporate the solvent DMF and complete the crosslinking through the $ZnCl_2$ mediated electrophilic aromatic substitution of the benzene rings with the benzylic groups of CMS. The absence of $ZnCl_2$ did not give viable membranes, as PBASS leaches out from the polymer blend in aqueous media. As shown in FIG. 2, homogeneous and transparent membranes were obtained after annealing. It is worth noting that the annealing of the membrane above 110° C. gives the α crystalline phase which is essential for PVDF with the desired mechanical strength and flexibility.[74-35] PVDF films cast below an annealing temperature of 70° C. primarily consist of β crystalline phase and that is mechanically weaker Ion Exchange Capacity (IEC).

It has been well known that the IEC values directly depend on the molarity of the sulfonic acid groups in the membranes and thus they are indicative of the actual ion exchange sites available for proton conduction.[47] As expected, the membrane IEC and proton conductivity increased approximately linearly with PSSA content as well as water swelling and methanol permeability (Table 3).[75-76] Generally higher IEC values are desirable to enhance proton conductivities and hence fuel cell performance. However, it is worth noting that the membrane methanol permeability had a monotonic increase with PSSA content which reduces fuel cell performance. Therefore, it is critical to balance the proton conductivity and the methanol permeability of membranes.

Water Uptake.

Figure 3:
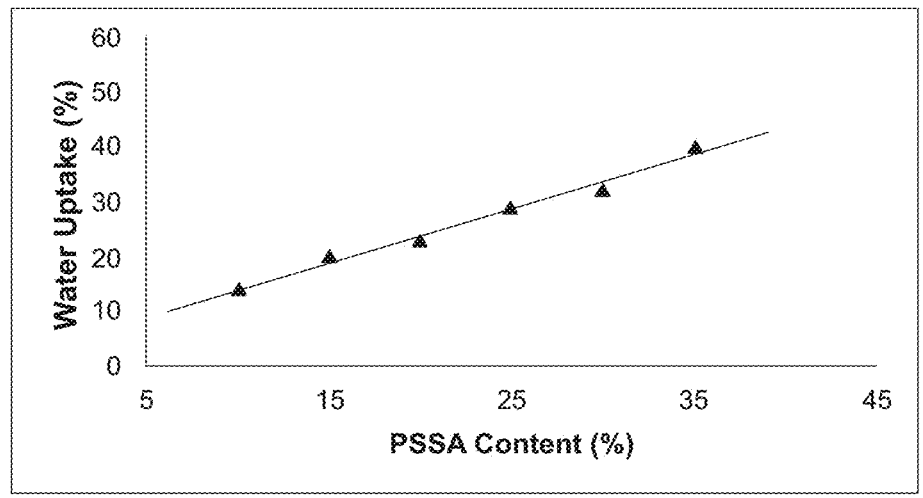
FIG. 3. Water uptake values of various PSSA/PVDF membranes with different PSSA content.

The water uptake of pure PVDF membrane is negligible and increases nearly linearly and reproducibly with increasing PSSA content (Figures-3). Furthermore the hydration numbers, although are quite similar and correspond roughly to about 12 water molecules per PSSA unit (Table-3).

Water uptake, particularly above 20 wt. percent PSSA copolymer, is much higher compared with other membranes such as sulfonated PEEK/PVDF[53] sulfonated polystyrene/PVDF composites.[51] This is clearly due to the high degrees of sulfonation of the PSSA copolymers through direct copolymerization of BASS rather than relatively inefficient and sometimes poorly reproducible post-polymerization sulfonations that require elevated temperatures or especially harsh conditions and do lead to side reactions. Membranes with PSSA contents above 40 percent show excessive swelling that adversely affects their mechanical properties and increases methanol permeability to unacceptable values. The milder direct copolymerization procedures that avoid sulfonation of the polymer matrix are expected to show good reproducibilities that have often not been documented in other reports.

Proton Conductivity and Ion Exchange Capacities.

The correlation between the proton conductivity and ion exchange capacities of the polymer blend membranes and

TABLE 3

Characteristics of PVDF-PSSA membranes as function of PSSA content.[a,b]

| Membrane | Calc. PSSA (wt. %) | (IEC) (mmol/g) | Proton conductivity (mS/cm) | Methanol Permeability $10^{-7}(cm^2 \cdot sec^{-1})$ | Water (wt. %) | $[H_2O]$[c] $\overline{[PSSA]}$ |
|---|---|---|---|---|---|---|
| M10 | 10 | 0.51 | 18.2 | 0.3 | 13.9 | 13.5 |
| M15 | 15 | 0.80 | 49.6 | 1.0 | 19.7 | 12.9 |
| M20 | 20 | 0.96 | 78.6 | 5.8 | 22.6 | 11.7 |
| M25 | 25 | 1.10 | 115.6 | 9.9 | 28.6 | 12.1 |
| M30 | 30 | 1.22 | 132.8 | 12.8 | 32.2 | 10.9 |
| M35 | 35 | 1.36 | 173.3 | 15.0 | 39.5 | 11.5 |
| NAFION ® 117 | — | 0.95 | 76.3 | 15.9 | 38 | 19.4[d] |

[a]IEC was measured in fully hydrated state at 25° C. using the "four probe" method.[71]
[b]Methanol permeability was measured at 25° C. at an initial concentration of 2.0M MeOH.
[c]moles of water per mole of PSSA.
[d]Estimated value based on IEC and conductance data.

Figure 4:
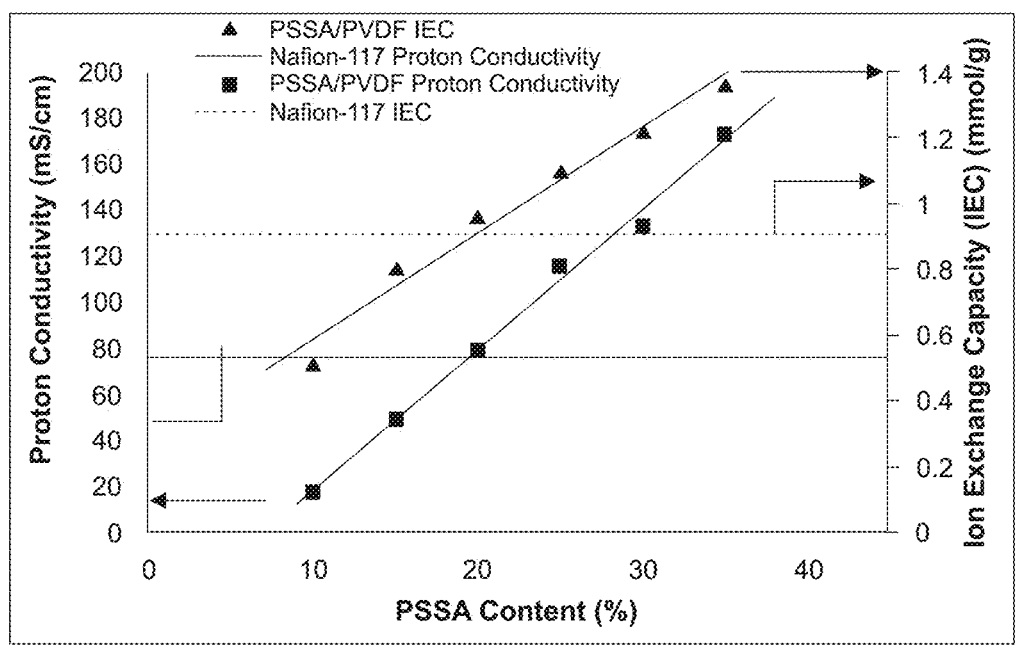
FIG. 4. Relationships between proton conductivity/IEC of PSSA/PVDF polymer blend membranes and PSSA.

PSSA membrane content is shown in FIG. 4. Proton conductivity of membranes increase nearly linearly with PSSA while IEC changes linearly at higher PSSA content. For PSSA weight fractions above 20%, the IEC and the proton conductivity of the PSSA-PVDF type membranes were comparable to or exceeded that of NAFION®-117.

Methanol Permeability.

Figure 5:
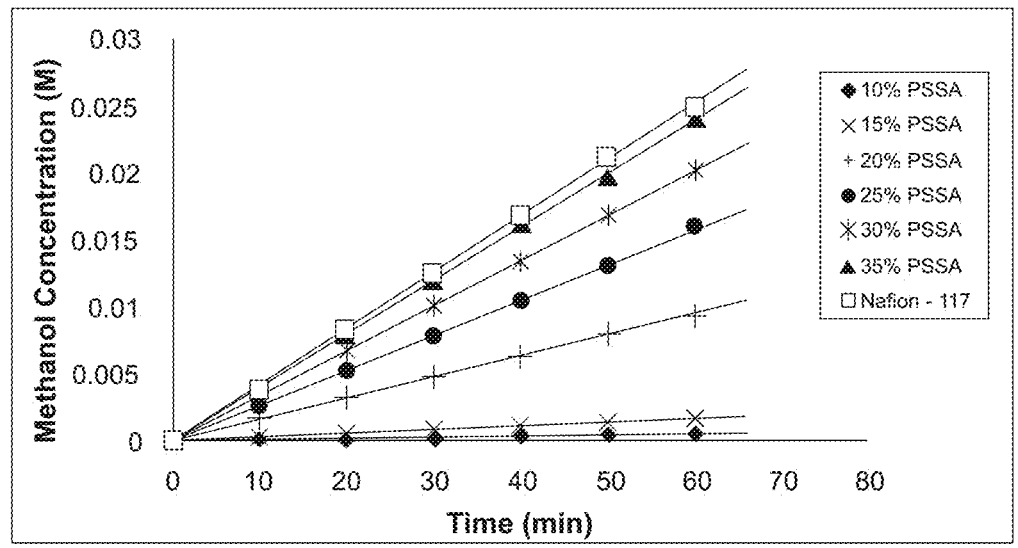
FIG. 5. Methanol concentration vs. time of through membranes with varying PSSA contents.

The spontaneous diffusion of 2.0M aqueous methanol through the membranes was measured as indicated in the Experimental section (FIG. 5). The plot of methanol concentration into the aqueous compartment versus time was shown to be linear consistent with a simple diffusion process. It is important to stress that the rates of methanol diffusion are highly reproducible as well. This is clearly important for any industrial applications.

Figure 6:
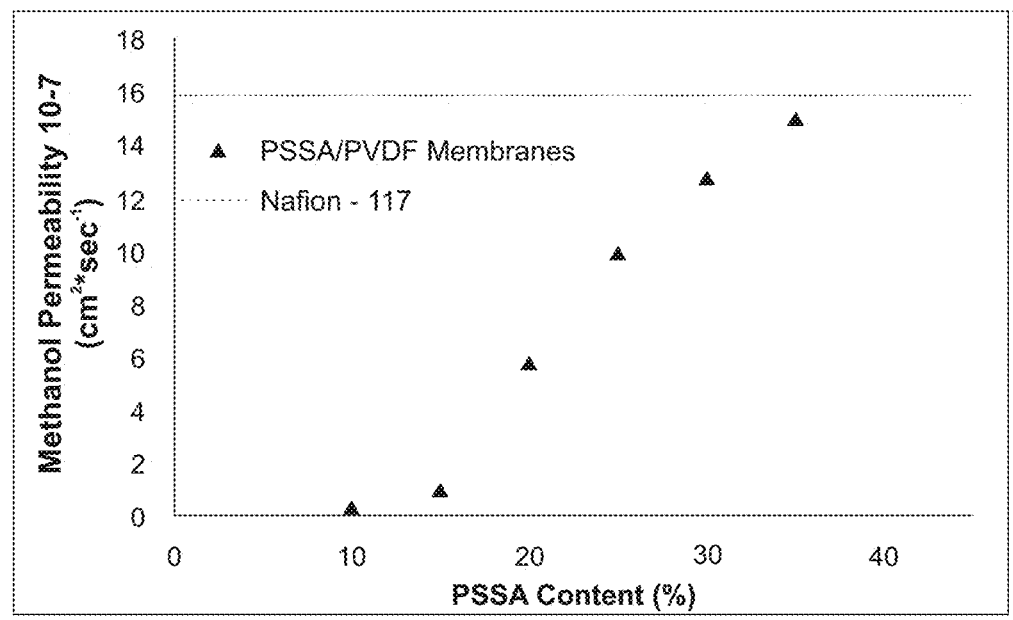
FIG. 6. Dependence of methanol permeability on PSSA content for PSSA/PVDF membranes.

The corresponding methanol diffusion coefficients are plotted vs. PSSA content as shown in FIG. 6. PVDF membranes are known to be methanol impermeable and continue to be so below 10 wt. percent PSSA indicating a lack of percolation of methanol through membranes. Above this limit methanol permeability increases sharply between 10 and 15 percent presumably due to an increase connected hydrophilic channels and hence larger degrees of percolation enabling the controlled diffusion of methanol. Significantly, even membranes with high PSSA contents (35 wt. %) still gave lower methanol diffusion coefficients than that of NAFION®-117.

Reproducibilities.

Figure 7:
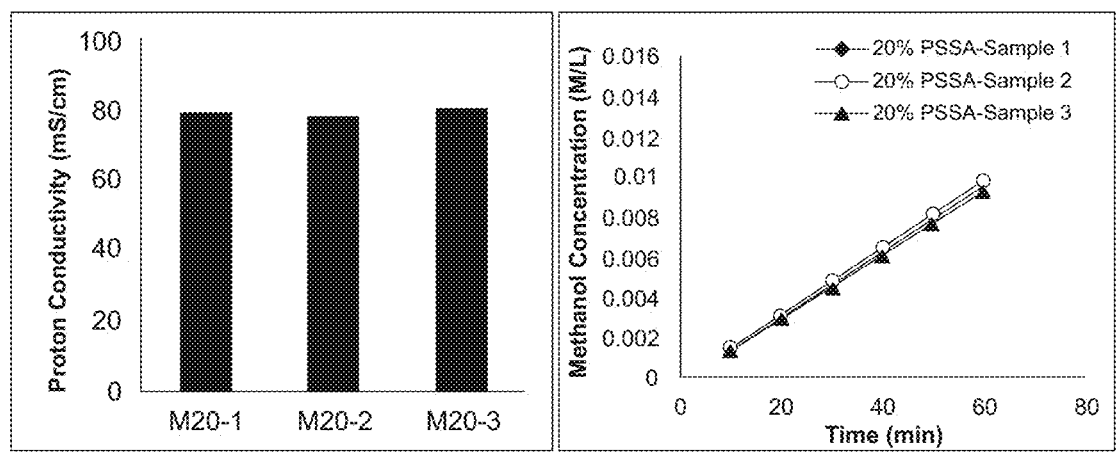
FIG. 7. Reproducibility shown by consistent proton conductance values and methanol permeability of PBASS membranes with the same PSSA content (20 wt. %) but fabricated using different polymer precursors at different days.

Membrane properties are seen to be highly reproducible. This is typically difficult to achieve with membranes made with direct sulfonation methods. Polymer electrolyte membranes prepared by post-polymerization sulfonation methods, which require elevated temperatures or especially harsh conditions, usually and sometimes unavoidably suffer from inefficient and poorly reproducible sulfonation.[40] The direct copolymerization of styrene sulfonate carried out under much milder and homogeneous conditions should lead to much greater reproducibility of membrane properties and this is what we find. Literature data indicate the occurrence of essentially random copolymerizations in this case. Furthermore this can be verified through standard and well known methods. Hence the properties of the membranes are expected to be subject to very small random fluctuations. To verify this, the physical characterization of several membranes with the same polymer composition (20 wt. % PSSA copolymer) but fabricated using different polymer precursors on different days have been carried out. As shown in FIG. 7, proton conductivities of these membranes showed nearly identical proton conductivities (2.01 mS/cm±2.7%). This reproducibility was found as well for methanol permeabilities as demonstrated by nearly overlapping methanol diffusion curves (FIG. 7).

Transmission Electron Microscopy.

Figure 8:
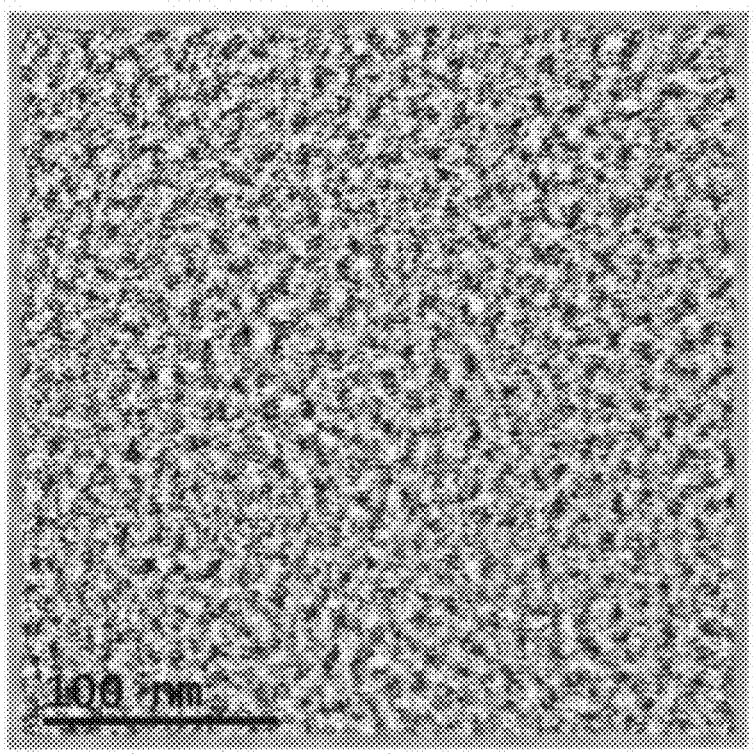
FIG. 8. Transmission Electron Microscopy (TEM) images of membrane M20 stained with Pb(NO3)2.
Figure 9:
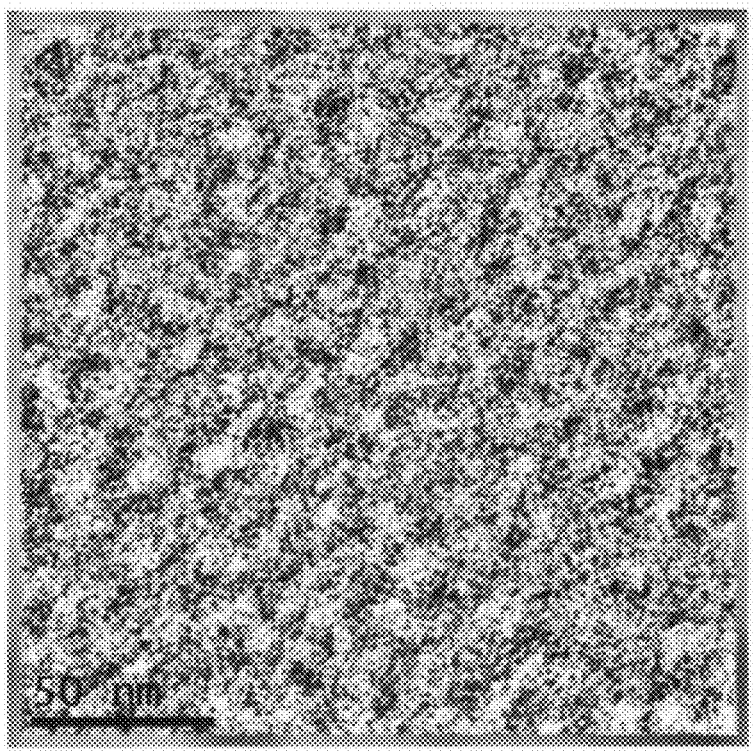
FIG. 9. Transmission Electron Microscopy (TEM) images of membrane M30 stained with Pb(NO3)2.

Membrane samples were stained with $Pb(NO_3)_2$ and embedded in a epoxy resin before microtoming into TEM samples. FIGS. 8 and 9 show the TEM morphology of 20% PSSA and 30% PSSA membranes, respectively. In the micrograph, the dark sites are sulfonic acid aggregates stained with lead ions ($Pb(NO_2)$). The degree of darkness seen in the ionic domains sites depends on local benzene sulfonic acid concentrations and the depths of the ionic clusters below the film surface. The ionic clusters have sizes around 4-5 nm, which is smaller than reported for NAFION® (>7 nm).[77-78] The presence of even smaller (1-2 nm) ionic subdomains may be inferred.

This may explain, in part, the lower methanol diffusion rates of the PDVF-PSSA membranes. The relatively even dispersion of ionic clusters indicates the excellent homogeneity of membranes, which exhibit high optical transparencies (>90 percent above 300 nm).

Scanning Electron Microscopy and Energy-Dispersive X-Ray Spectroscopy.

Figure 10:
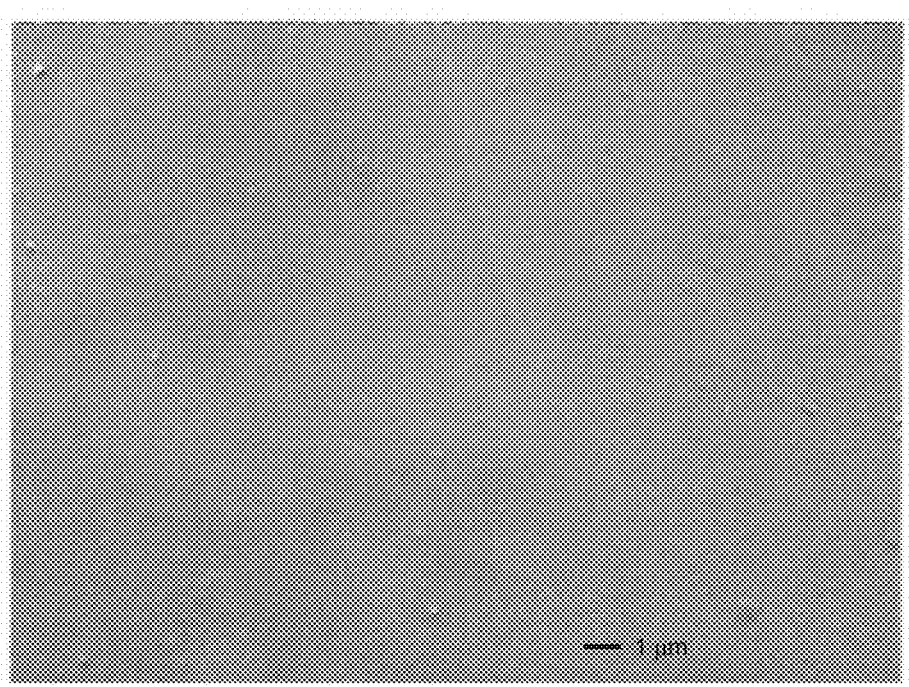
FIG. 10. The SEM image of membrane M30.
Figure 11:
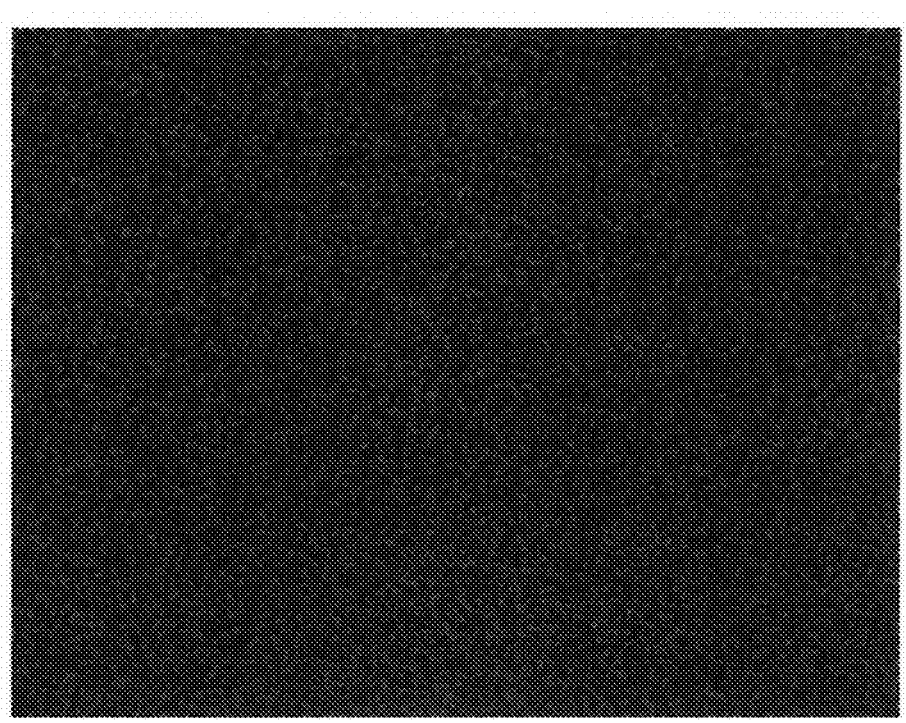
FIG. 11. Corresponding quantitative EDS element mapping of sulfur on the surface of membrane M30.
Figure 12:
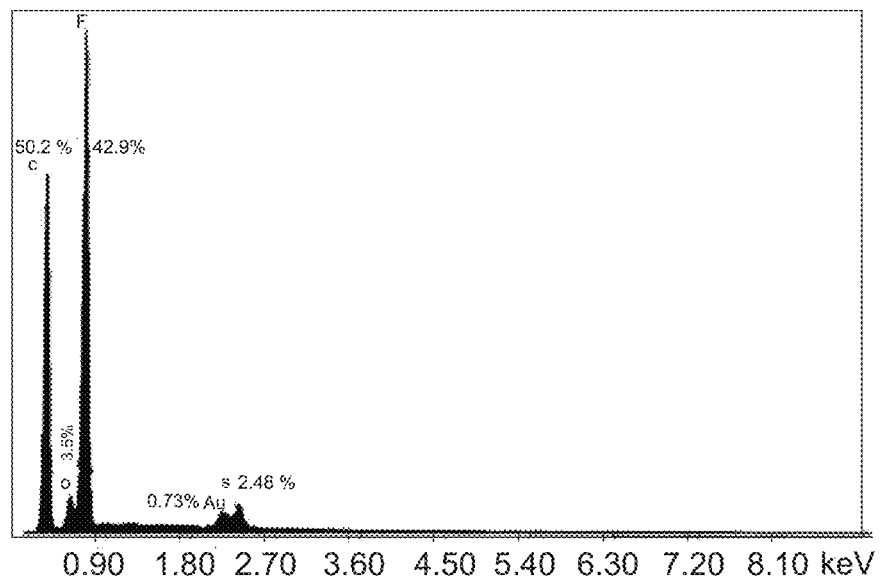
FIG. 12. Element compositions of membrane M30 coated with a thin layer of gold.

The surface morphology of PSSA/PVDF membranes was investigated with scanning electron microscopy (SEM). Membranes prepared by mixing polystyrene or its copolymers with PVDF followed by sulfonation were reported to have a very coarse morphology with irregular and large size domains.[51-52] However, as shown in FIG. 10, PSSA/PVDF membranes exhibited very smooth surface evident by no separated individual polymer domains, which also indicated the homogeneity of present membranes. The density and distribution of the —$SO_3H$ groups on the PSSA/PVDF modular membrane are also confirmed by surface electron microscopy (SEM) and quantitative energy dispersive X-ray spectroscopy (EDS) mapping. The SEM (FIG. 10) gives a highly homogeneous appearance consistent with the TEMs. As indicated in FIG. 11, sulfur (from $SO_3$ anion) is found to be homogeneously distributed indicating the absence of large domains as seen also in the TEMs. Surface analysis by energy dispersive X ray spectroscopy (FIG. 12) shows that the element mass ratios of carbon, oxygen, fluorine and sulfur are 50.2, 3.8, 42.9, and 2.48%, respectively in good semi-quantitative agreement with calculated compositions. The density of the sulfonic acid groups on the surface of the PSSA/PVDF membrane was calculated to be ~0.8 mmol $g^{-1}$, which is lower than the ion exchange capacity of the membrane (1.22 mmol $g^{-1}$) possibly due to the lower surface energy of the PVDF (30.3 mN/m at 20° C.) that should dominate the surface.

Thermal Stabilities.

Figure 13:
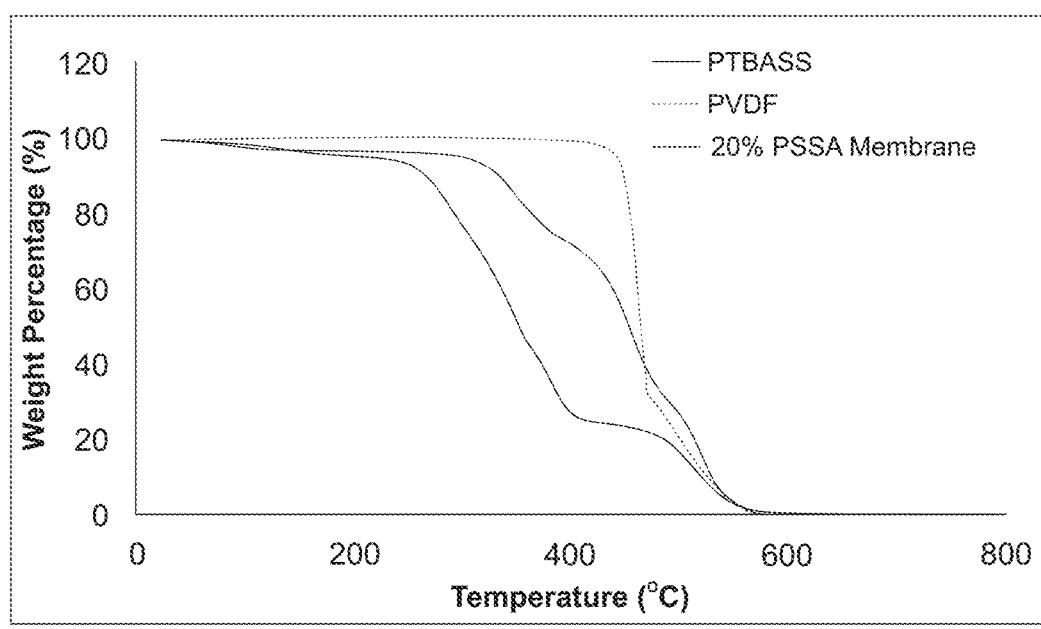
FIG. 13. Thermal degradation study of PTBASS, PVDF and PSSA/PVDF polymer blend membrane via thermogravimetric analysis.

The thermal properties of membranes of hydrated PSSA/PVDF and corresponding pure terpolymer P(TBASS-S-CMS) and PVDF were studied by thermal gravimetric analysis (TGA) as seen in FIG. 13. The PSSA/PVDF and corresponding pure terpolymer P(TBASS-S-CMS) show a two-step weight loss pattern with the initial (<2%) weight loss attributable to a gradual loss of water.

The first weight loss of the precursor P(TBASS-S-CMS) starting at 280° C. may be associated with the onset of decomposition of benzene sulfonic acid groups and/or depolymerization. The second decomposition in range of 400-550° C. is attributed to the degradation of the polystyrene backbone. The PSSA/PVDF membrane shows three-step decomposition with additional step of PVDF degradation.[51] These results suggest that PSSA/PVDF membranes are thermally stable up to about 300° C., which is far above the anticipated DMFC operating temperature of 90-120° C. This indicated potential for the use in hydrogen and other fuel cells as well.

Mechanical Properties.

Figure 14:
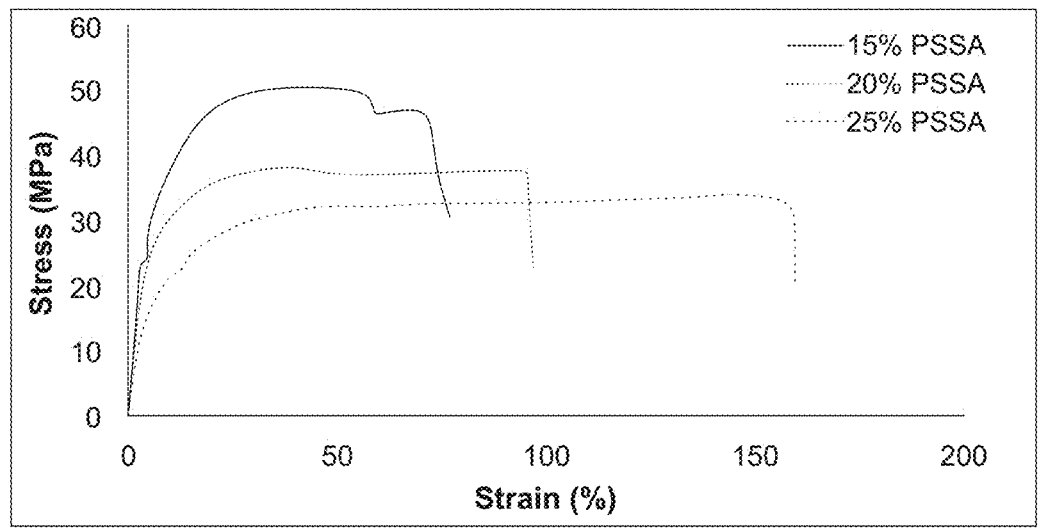
FIG. 14. Tensile tests of PSSA/PVDF polymer blend membranes with different PSSA loading contents. Data on NAFION® to be added.

Mechanical strength is essential to the processing and the lifetime of a fuel cell. As shown in Table-4 and FIG. 14, the Young's moduli of the PSSA-PVDF membranes were much higher (up to about 12 fold) than that of the NAFION®-117. The maximum strengths were also between 40 and 120% higher. The M15, M20 and M25 samples gave much higher Young's moduli as well as maximum strengths.

TABLE 4

Mechanical properties of fully hydrated PSSA/PVDF membranes

| Membranes | Young's Modulus (GPa) | Maximum strength (MPa) | Maximum elongation (%) |
|---|---|---|---|
| M15 | 1.36 | 50.6 | 76 |
| M20 | 0.95 | 38.2 | 96 |
| M25 | 0.55 | 34.1 | 159 |
| NAFION ®-117 | 0.11 | 24 | >180 |

As the tensile tests were performed on fully hydrated membranes the strengths of membranes decreased with increasing PSSA and hence water content with water acting as a plasticizer and resulting in larger maximum elongations. The superior mechanical strength and flexibility of the membranes compared with NAFION® is an additional advantage. This is presumably due to superior degrees of homogeneity as demonstrated by TEM, SEM, optical transmission (OT) and other methods.

Fuel Cell Performance.

Figure 15A:
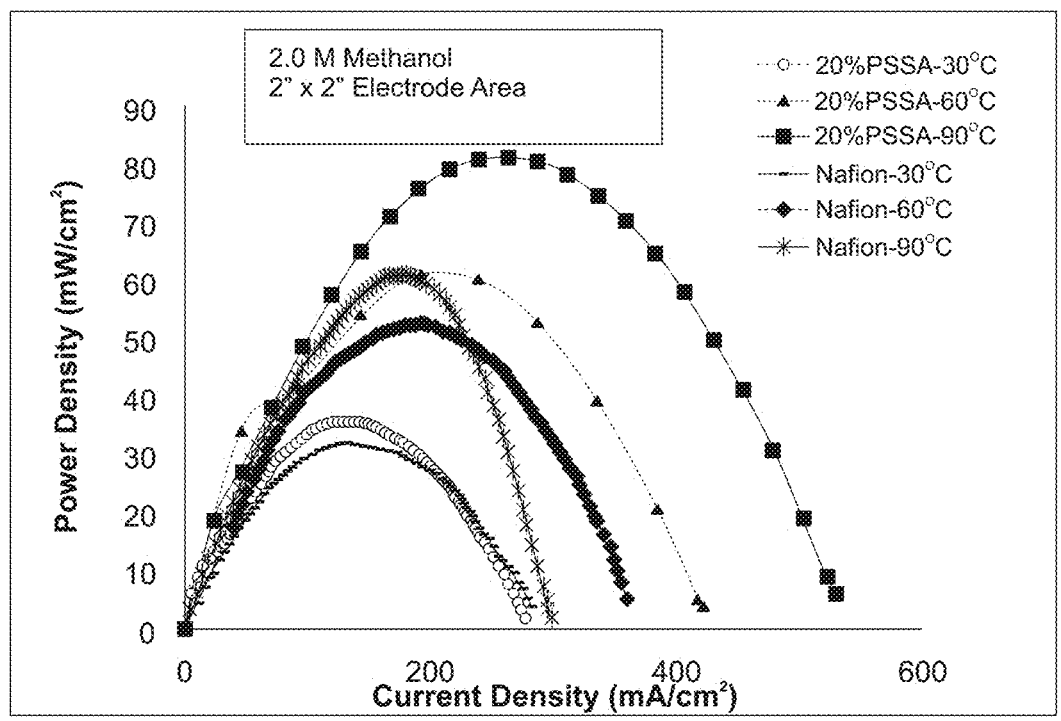
FIG. 15a. Temperature dependence of power density output of the M20 membrane and NAFION® 117 in DMFC in 2.0 M aqueous methanol. Electrode Area: 2"×2"; Oxygen pressure and flow: 0.02 L/min and 1 atm. respectively.
Figure 15B:
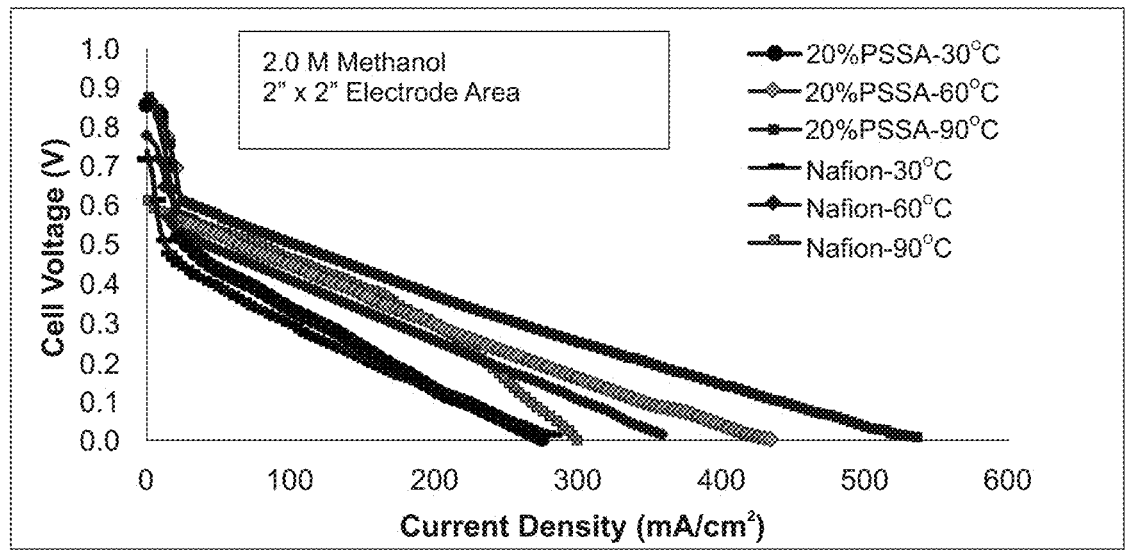
FIG. 15b. Temperature dependence of cell voltage vs. current density of the M20 membrane and NAFION® 117 in DMFC in 2.0 M aqueous methanol. Electrode Area: 2"×2"; Oxygen pressure and flow: 0.02 L/min and 1 atm. respectively.

The electrical performance characterization of M20 (20 wt. % PSSA) is shown in FIGS. 15a and b. As expected the PSSA content played a key role in the electrical performance of the DMFC.[49, 79]

In contrast with NAFION®-117, the power densities of the M20 membranes at 60 and 90° C. are maintained above 400 and 500 mA/cm$^2$ respectively whereas the cell voltages and power densities of NAFION®-117 at 90 and 60° C. drop off sharply at 300 and 350 mA/cm$^2$ in 2M methanol utilizing ambient oxygen. The linear slope of polarization plot for membrane M20 at 90° C. is maintained even at high current densities suggesting oxygen flow was sufficient even at 0.02 L/min. One the other hand, the sharp decrease of the fuel cell performance of NAFION®-117 at 90° C. indicated that methanol crossover and water flooding and low oxygen concentration became problematic for NAFION®-117 at high current densities.

Figure 16A:
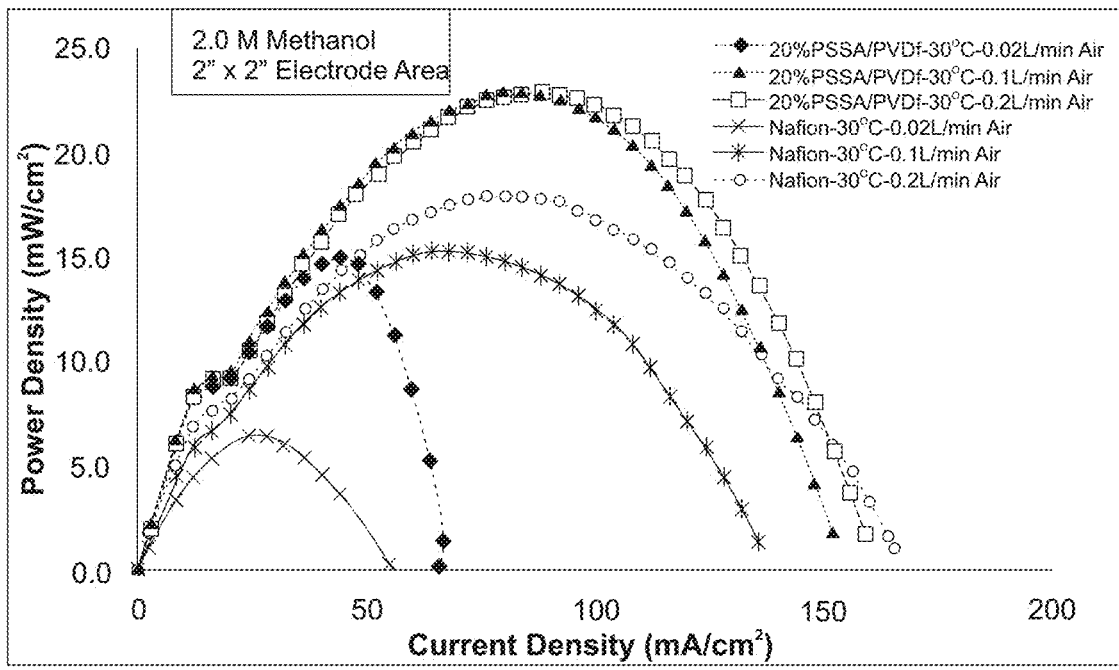
FIG. 16a. Power density output of the M20 membrane and NAFION® 117 in DMFC in 2.0 M aqueous methanol at different temperatures and air flows. Electrode Area: 2"×2".
Figure 16B:
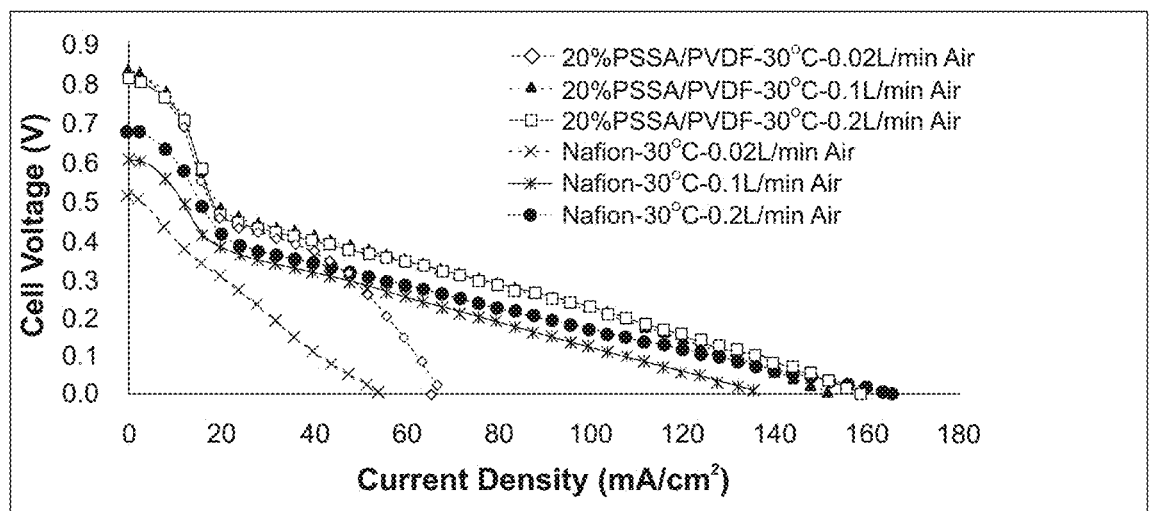
FIG. 16b. Cell voltage vs. current density for PSSA/PVDF membrane and NAFION®-117 with 2.0 M aqueous methanol at 30° C. at varying air flows.

The performance of the membranes in ambient air are shown in FIGS. 16a and b. The fuel cell performance of M20 is even more improved compared to that of NAFION®-117. For instance the maximum power density of membrane M20 was 132 percent higher at low airflows (0.02 L/min) and about 30 percent at greater air flows (0.2 L/min). This also reflected in the voltage vs. current densities. At lower air flows (0.02 L/min), mass transfer of oxygen becomes an issue as cell voltage and power density decrease at high current densities. For membrane M20, the mass transfer limitation of oxygen was quickly resolved by increasing the air flow to 0.1 L/min, whereas the performance of NAFION®-117 critically depends on air flows to remove water from the cathode thus making available more sites for oxygen diffusion. These increases in performance at larger air flows are somewhat lower but are still consistently higher. We believe that these performance differences are due primarily to lower methanol crossover. We speculate that this may be due to the extremely small hydrophilic domains that are well below that of NAFION® and hence may reduce methanol diffusion.

Figure 17:
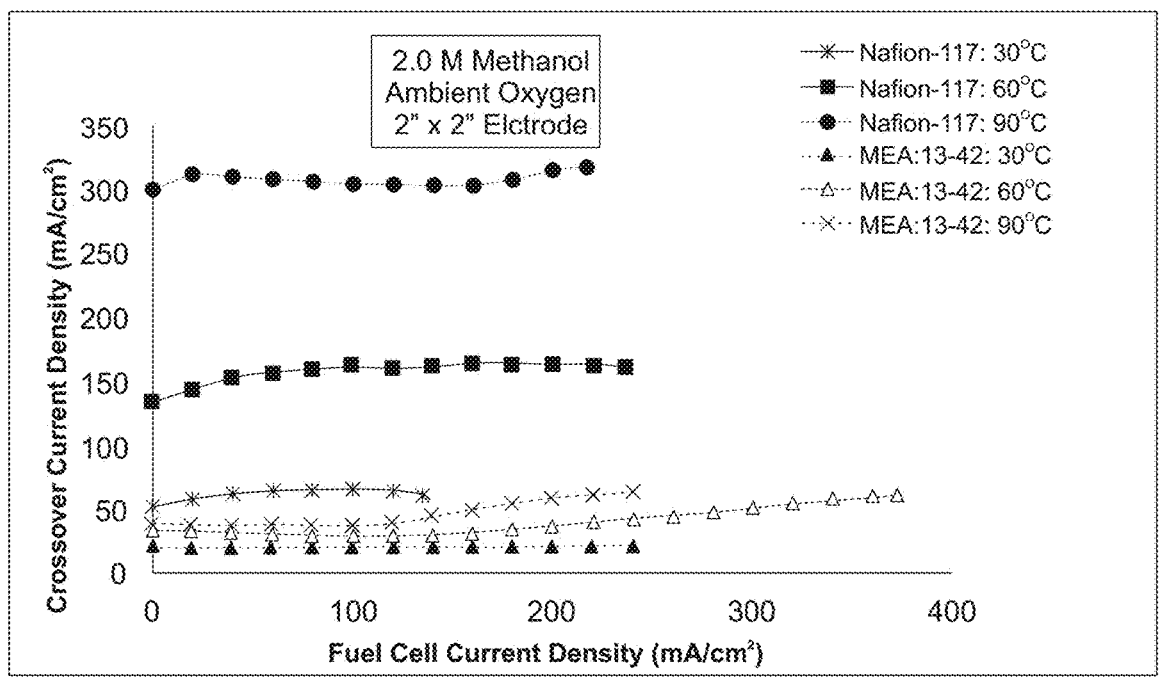
FIG. 17. Temperature effect on methanol crossover density of MEA 13-42 (20 wt % PSSA) and NAFION®-117.
Figure 18:
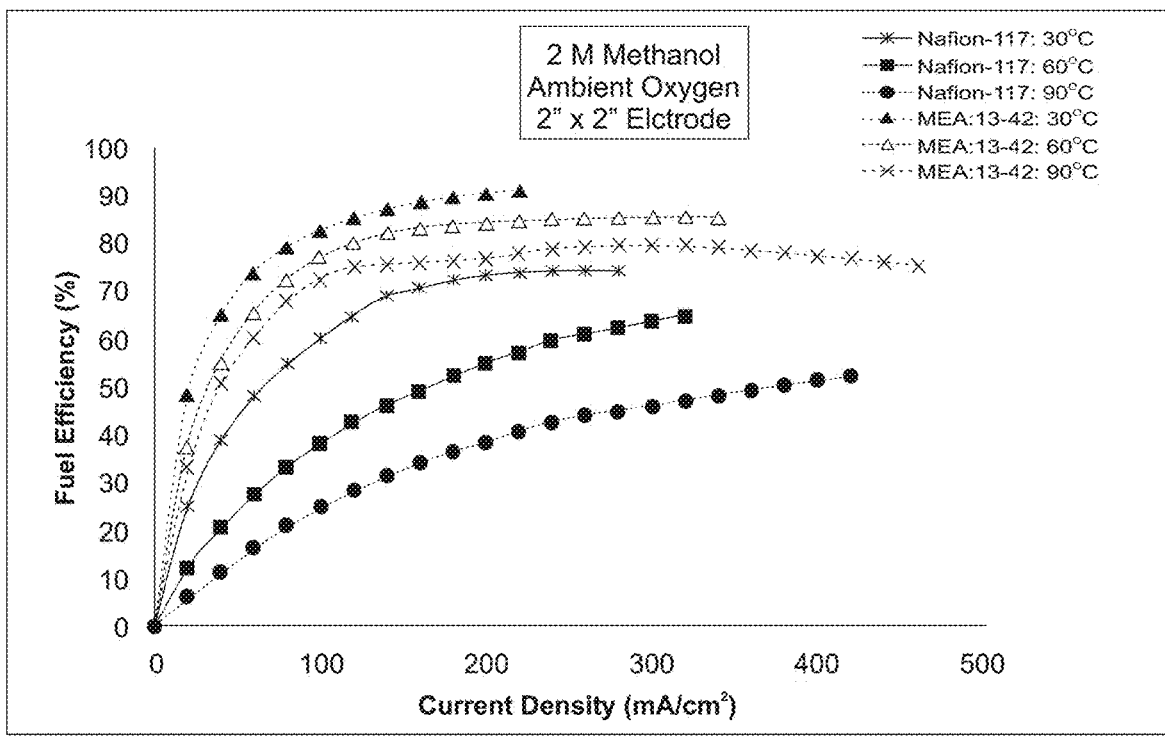
FIG. 18. Fuel efficiency of MEA 13-42 (20 wt % PSSA) and NAFION®-117 at various temperatures.

FIG. 17 provides the temperature effect on methanol crossover density of MEA 13-42 (20 wt % PSSA) and NAFION®-117. FIG. 18 provides the fuel efficiency of MEA 13-42 (20 wt % PSSA) and NAFION®-117 at various temperatures.

CONCLUSIONS

One of the key advantages of using binary blend based PEM membranes is the independent control of both components using a modular approach. Thus, one component gives an acid stable scaffold with the required mechanical properties while the polymer acid provides for proton transport. This, in turn, carries a number of further advantages. First the molecular weight (MW) of either the polymer scaffold of the proton or other ion conductors can be changed independently. Second, the IEC and proton conductivity can be easily adjusted by varying the fractions of the two polymer components without redesigning the membrane. This leads to better reproducibilities as shown above. Third, the modular approach helps to avoid direct sulfonation through copolymerization of BASS or analogous polymerizable ionic monomers so that side reactions resulting from aggressive sulfonation conditions are absent or minimal. Fourth the inclusion of a wide variety of polymerizable monomers such as t-butylammomium vinylsulfonate or other comonomers is of interest in the optimization of the membranes. Fourth, crosslinking is controlled separately from polymerization through (a) variation of the structure of crosslinking comonomer(s), (b) molar content of the crosslinking comonomers, (c) the type and concentration of Lewis acid (i.e. $CuCl_2$, $ZnCl_2$, $FeCl_3$ $AlCl_3$ or other Lewis acid) and (d) crosslinking temperature. Furthermore the extension of this approach to other membranes or polymer catalysts is feasible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. Olah, G. A., Beyond oil and gas: the methanol economy. *Angew Chem Int Ed Engl* 2005, 44 (18), 2636-9.
2. Zhang, H.; Shen, P. K., Advances in the high performance polymer electrolyte membranes for fuel cells. *Chem Soc Rev* 2012, 41 (6), 2382-94.
3. Gold, S. A., Low-Temperature Fuel Cell Technology for Green Energy. *Handbook of Climate Change Mitigation* 2012, 1657-1702.
4. Boudghene Stambouli, A.; Traversa, E., Fuel cells, an alternative to standard sources of energy. *Renewable and Sustainable Energy Reviews* 2002, 6 (3), 295-304.
5. Wang, Y.; Chen, K. S.; Mishler, J.; Cho, S. C.; Adroher, X. C., A review of polymer electrolyte membrane fuel cells: Technology, applications, and needs on fundamental research. *Applied Energy* 2011, 88 (4), 981-1007.
6. Kirubakaran, A.; Jain, S.; Nema, R. K., A review on fuel cell technologies and power electronic interface. *Renew Sust Energ Rev* 2009, 13 (9), 2430-2440.
7. Dillon, R.; Srinivasan, S.; Arico, A. S.; Antonucci, V., International activities in DMFC R&D: status of technologies and potential applications. *Journal of Power Sources* 2004, 127 (1-2), 112-126.
8. Costamagna, P.; Srinivasan, S., Quantum jumps in the PEMFC science and technology from the 1960s to the year 2000 Part I. Fundamental scientific aspects. *Journal of Power Sources* 2001, 102 (1-2), 242-252.
9. Steele, B. C.; Heinzel, A., Materials for fuel-cell technologies. *Nature* 2001, 414 (6861), 345-52.

10. Zaidi, S. M. J., Advanced Membrane Materials for Fuel Cell Applications. *Materials Science Forum* 2010, 657, 88-115.
11. Hickner, M. A.; Pivovar, B. S., The chemical and structural nature of proton exchange membrane fuel cell properties. *Fuel Cells* 2005, 5 (2), 213-229.
12. Mehta, V.; Cooper, J. S., Review and analysis of PEM fuel cell design and manufacturing. *Journal of Power Sources* 2003, 114 (1), 32-53.
13. Peighambardoust, S. J.; Rowshanzamir, S.; Amjadi, M., Review of the proton exchange membranes for fuel cell applications. *International Journal of Hydrogen Energy* 2010, 35 (17), 9349-9384.
14. Roziére, J.; Jones, D. J., Non-Fluorinated polymer materials for proton exchange membrane fuel cells. *Annual Review of Materials Research* 2003, 33 (1), 503-555.
15. Devanathan, R., Recent developments in proton exchange membranes for fuel cells. *Energy & Environmental Science* 2008, 1 (1), 101-119.
16. Tsang, E. M. W.; Zhang, Z. B.; Yang, A. C. C.; Shi, Z. Q.; Peckham, T. J.; Narimani, R.; Frisken, B. J.; Holdcroft, S., Nanostructure, Morphology, and Properties of Fluorous Copolymers Bearing Ionic Grafts. *Macromolecules* 2009, 42 (24), 9467-9480.
17. Zhang, H.; Shen, P. K., Recent development of polymer electrolyte membranes for fuel cells. *Chem Rev* 2012, 112 (5), 2780-832.
18. Zhou, Z.; Dominey, R. N.; Rolland, J. P.; Maynor, B. W.; Pandya, A. A.; DeSimone, J. M., Molded, high surface area polymer electrolyte membranes from cured liquid precursors. *J Am Chem Soc* 2006, 128 (39), 12963-72.
19. Wu, J. F.; Yuan, X. Z.; Martin, J. J.; Wang, H. J.; Zhang, J. J.; Shen, J.; Wu, S. H.; Merida, W., A review of PEM fuel cell durability: Degradation mechanisms and mitigation strategies. *Journal of Power Sources* 2008, 184 (1), 104-119.
20. Hickner, M. A.; Ghassemi, H.; Kim, Y. S.; Einsla, B. R.; McGrath, J. E., Alternative Polymer Systems for Proton Exchange Membranes (PEMs). *Chemical Reviews* 2004, 104 (10), 4587-4612.
21. Ye, Y. S.; Rick, J.; Hwang, B. J., Water Soluble Polymers as Proton Exchange Membranes for Fuel Cells. *Polymers* 2012, 4 (2), 913-963.
22. Garc'ia, B. L.; Weidner, J. W., Review of Direct Methanol Fuel Cells. *Modern Aspects of Electrochemistry* 2007, 40, 229-284.
23. Neburchilov, V.; Martin, J.; Wang, H. J.; Zhang, J. J., A review of polymer electrolyte membranes for direct methanol fuel cells. *Journal of Power Sources* 2007, 169 (2), 221-238.
24. Surya Prakash, G. K.; Olah, G. A., Electrocatalysis of Direct Methanol Fuel Cells. From Fundamentals to Applications. Edited by Hansan Liu and Jiujun Zhang. *Angewandte Chemie International Edition* 2010, 49 (37), 6483-6483.
25. Ahmed, M.; Dincer, I., A review on methanol crossover in direct methanol fuel cells: challenges and achievements. *International Journal of Energy Research* 2011, 35 (14), 1213-1228.
26. Giddey, S.; Badwal, S. P. S.; Kulkarni, A.; Munnings, C., A comprehensive review of direct carbon fuel cell technology. *Progress in Energy and Combustion Science* 2012, 38 (3), 360-399.
27. Li, X. L.; Faghri, A., Review and advances of direct methanol fuel cells (DMFCs) part I: Design, fabrication, and testing with high concentration methanol solutions. *Journal of Power Sources* 2013, 226, 223-240.
28. Lufrano, F.; Baglio, V.; Staiti, P.; Antonucci, V.; Arico, A. S., Performance analysis of polymer electrolyte membranes for direct methanol fuel cells. *Journal of Power Sources* 2013, 243, 519-534.
29. Mitzel, J.; Arena, F.; Walter, T.; Stefener, M.; Hempelmann, R., Direct Methanol Fuel Cell—Alternative Materials and Catalyst Preparation. *Zeitschrift für Physikalische Chemie International journal of research in physical chemistry and chemical physics* 2014, 227, 497-540.
30. Kreuer, K. D., On the development of proton conducting polymer membranes for hydrogen and methanol fuel cells. *Journal of Membrane Science* 2001, 185 (1), 29-39.
31. Zhao, X.; Yin, M.; Ma, L.; Liang, L.; Liu, C. P.; Liao, J. H.; Lu, T. H.; Xing, W., Recent advances in catalysts for direct methanol fuel cells. *Energy & Environmental Science* 2011, 4 (8), 2736-2753.
32. Dong, F. L.; Li, Z. F.; Wang, S. W.; Xu, L. J.; Yu, X. J., Preparation and properties of sulfonated poly(phthalazinone ether sulfone ketone)/zirconium sulfophenylphosphate/PTFE composite membranes. *International Journal of Hydrogen Energy* 2011, 36 (5), 3681-3687.
33. Prakash, G. K. S.; Smart, M. C.; Wang, Q.-J.; Atti, A.; Pleynet, V.; Yang, B.; McGrath, K.; Olah, G. A.; Narayanan, S. R.; Chun, W.; Valdez, T.; Surampudi, S., High efficiency direct methanol fuel cell based on poly(styrenesulfonic) acid (PSSA)-poly(vinylidene fluoride) (PVDF) composite membranes. *Journal of Fluorine Chemistry* 2004, 125 (8), 1217-1230.
34. Chen, N.; Hong, L., Embedding poly(styrene sulfonic acid) into PVDF matrix—a new type of proton electrolyte membrane. *Polymer* 2004, 45 (7), 2403-2411.
35. Chikh, L.; Delhorbe, V.; Fichet, O., (Semi-)Interpenetrating polymer networks as fuel cell membranes. *Journal of Membrane Science* 2011, 368 (1-2), 1-17.
36. Chandan, A.; Hattenberger, M.; El-Kharouf, A.; Du, S. F.; Dhir, A.; Self, V.; Pollet, B. G.; Ingram, A.; Bujalski, W., High temperature (HT) polymer electrolyte membrane fuel cells (PEMFC)—A review. *Journal of Power Sources* 2013, 231, 264-278.
37. Berber, M. R.; Fujigaya, T.; Sasaki, K.; Nakashima, N., Remarkably durable high temperature polymer electrolyte fuel cell based on poly(vinylphosphonic acid)-doped polybenzimidazole. *Sci Rep* 2013, 3, 1764.
38. Dupuis, A. C., Proton exchange membranes for fuel cells operated at medium temperatures: Materials and experimental techniques. *Progress in Materials Science* 2011, 56 (3), 289-327.
39. Bose, S.; Kuila, T.; Thi, X. L. N.; Kim, N. H.; Lau, K. T.; Lee, J. H., Polymer membranes for high temperature proton exchange membrane fuel cell: Recent advances and challenges. *Progress in Polymer Science* 2011, 36 (6), 813-843.
40. Hickner, M. A.; Ghassemi, H.; Kim, Y. S.; Einsla, B. R.; McGrath, J. E., Alternative polymer systems for proton exchange membranes (PEMs). *Chem Rev* 2004, 104 (10), 4587-611.
41. Zhang, Z. C.; Chalkova, E.; Fedkin, M.; Wang, C. M.; Lvov, S. N.; Komarneni, S.; Chung, T. C. M., Synthesis and Characterization of Poly(vinylidene fluoride)-g-sulfonated Polystyrene Graft Copolymers for Proton Exchange Membrane. *Macromolecules* 2008, 41 (23), 9130-9139.
42. Shin, J. P.; Chang, B. J.; Kim, J. H.; Lee, S. B.; Suh, D. H., Sulfonated polystyrene/PTFE composite membranes. *Journal of Membrane Science* 2005, 251 (1-2), 247-254.
43. Su, Y.-H.; Liu, Y.-L.; Wang, D.-M.; Lai, J.-Y.; Sun, Y.-M.; Chyou, S.-D.; Lee, W.-T., The effect of side chain architectures on the properties and proton conductivities of poly(styrene sulfonic acid) graft poly(vinylidene fluoride) copolymer membranes for direct methanol fuel cells. *Journal of Membrane Science* 2010, 349 (1-2), 244-250.

44. Shin, J.; Chang, B.; Kim, J.; Lee, S.; Suh, D., Sulfonated polystyrene/PTFE composite membranes. *Journal of Membrane Science* 2005, 251 (1-2), 247-254.
45. Wei, Z.; He, S.; Liu, X.; Qiao, J.; Lin, J.; Zhang, L., A novel environment-friendly route to prepare proton exchange membranes for direct methanol fuel cells. *Polymer* 2013, 54 (3), 1243-1250.
46. Hodgdon, R. B.; Boyack, J. R., Study of swelling in two new ion exchange membranes. *Journal of Polymer Science Part A: General Papers* 1965, 3 (4), 1463-1472.
47. Golcuk, S.; Muftuoglu, A. E.; Celik, S. U.; Bozkurt, A., Synthesis and characterization of polymer electrolyte membranes based on PVDF and styrene via photoinduced grafting. *Journal of Polymer Research* 2013, 20 (5).
48. Laruelle, G.; Nicol, E.; Ameduri, B.; Tassin, J.-F.; Ajellal, N., Synthesis of poly(vinylidene fluoride)-b-poly (styrene sulfonate) block copolymers by controlled radical polymerizations. *Journal of Polymer Science Part A: Polymer Chemistry* 2011, 49 (18), 3960-3969.
49. Sang Chul, R.; Ji Hye, H.; Chang Keun, K., Polymer electrolyte membranes fabricated from poly(ethylene glycol dimethylmethacrylate-co-styrene sulfonic acid) copolymers for direct methanol fuel cell application. *Macromolecular Research* 2011, 20.
50. Zhang, Z.; Chalkova, E.; Fedkin, M.; Wang, C.; Lvov, S. N.; Komarneni, S.; Chung, T. C. M., Synthesis and Characterization of Poly(vinylidene fluoride)-g-sulfonated Polystyrene Graft Copolymers for Proton Exchange Membrane. *Macromolecules* 2008, 41 (23), 9130-9139.
51. Piboonsatsanasakul, P.; Wootthikanokkhan, J.; Thanawan, S., Preparation and characterizations of direct methanol fuel cell membrane from sulfonated polystyrene/poly(vinylidene fluoride) blend compatibilized with poly(styrene)-b-poly(methyl methacrytlate) block copolymer. *Journal of Applied Polymer Science* 2008, 107 (2), 1325-1336.
52. Seeponkai, N.; Wootthikanokkhan, J., Proton Exchange Membranes for a Direct Methanol Fuel Cell Based on Sulfonated Styrene-(ethylene-butylene)-Styrene/Polyvinylidene Fluoride Blends. *Journal of Applied Polymer Science* 2010, 117 (1), 393-399.
53. Wootthikanokkhan, J.; Seeponkai, N., Methanol permeability and properties of DMFC membranes based on sulfonated PEEK/PVDF blends. *Journal of Applied Polymer Science* 2006, 102 (6), 5941-5947.
54. Ajji, A.; Utracki, L. A., Interphase and compatibilization of polymer blends. *Polymer Engineering & Science* 1996, 36 (12), 1574-1585.
55. Kerres, J., Blend Concepts for Fuel Cell Membranes. In *Polymer Membranes for Fuel Cells*, Javaid, Z. S. M.; Matsuura, T., Eds. Springer US: 2009; pp 1-37.
56. Kumar, P.; Dutta, K.; Das, S.; Kundu, P. P., Membrane prepared by incorporation of crosslinked sulfonated polystyrene in the blend of PVdF-co-HFP/NAFION®: A preliminary evaluation for application in DMFC. *Applied Energy* 2014, 123, 66-74.
57. Moszczyńiski, P.; Kalita, M.; Parzuchowski, P.; Siekierski, M.; Wieczorek, W., Interpenetrating ionomer-polymer networks obtained by the in situ polymerization in pores of PVdF sponges as potential membranes in PEMFC applications. *Journal of Power Sources* 2007, 173 (2), 648-656.
58. Oikonomou, E. K.; Bethani, A.; Bokias, G.; Kallitsis, J. K., Poly(sodium styrene sulfonate)-b-poly(methyl methacrylate) diblock copolymers through direct atom transfer radical polymerization: Influence of hydrophilic-hydrophobic balance on self-organization in aqueous solution. *European Polymer Journal* 2011, 47 (4), 752-761.
59. Arunbabu, D.; Sanga, Z.; Seenimeera, K. M.; Jana, T., Emulsion copolymerization of styrene and sodium styrene sulfonate: kinetics, monomer reactivity ratios and copolymer properties. *Polymer International* 2009, 58 (1), 88-96.
60. Ameduri, B., From vinylidene fluoride (VDF) to the applications of VDF-containing polymers and copolymers: recent developments and future trends. *Chem Rev* 2009, 109 (12), 6632-86.
61. Huang, W.; Zhao, M.; Yang, F.; Farovitch, L.; Haghighi, P.; Macisco, L. J.; Swob, T.; Smith, T.; Cebe, P., PVDF-based Polymer Blend Films for Fuel Cell Membranes. *MRS Proceedings* 2012, 1384.
62. Qiu, X. P.; Li, W. Q.; Zhang, S. C.; Liang, H. Y.; Zhu, W. T., The microstructure and character of the PVDF-g-PSSA membrane prepared by solution grafting. *Journal of the Electrochemical Society* 2003, 150 (7), A917-A921.
63. Xue, S. N.; Yin, G. P., Proton exchange membranes based on poly(vinylidene fluoride) and sulfonated poly (ether ether ketone). *Polymer* 2006, 47 (14), 5044-5049.
64. Dai, C. A.; Liu, C. P.; Lee, Y. H.; Chang, C. J.; Chao, C. Y.; Cheng, Y. Y., Fabrication of novel proton exchange membranes for DMFC via UV curing. *Journal of Power Sources* 2008, 177 (2), 262-272.
65. Wang, Z.; Jiang, D. D.; McKinney, M. A.; Wilkie, C. A., Cross-linking of polystyrene by Friedel-Crafts chemistry to improve thermal stability. *Polymer Degradation and Stability* 1999, 64 (3), 387-395.
66. Li, J. M.; Wilkie, C. A., Improving the thermal stability of polystyrene by Friedel-Crafts chemistry. *Polymer Degradation and Stability* 1997, 57 (3), 293-299.
67. Zhu, J.; McKinney, M. A.; Wilkie, C. A., Stabilization of polystyrene by Friedel-Crafts chemistry: effect of position of alcohol and the catalyst. *Polymer Degradation and Stability* 1999, 66 (2), 213-220.
68. Wang, Z.; Jiang, D. D.; Wilkie, C. A.; Gilman, J. W., Further studies on fire retardant polystyrene by Friedel-Crafts chemistry. *Polymer Degradation and Stability* 1999, 66 (3), 373-378.
69. Tricoli, V., Proton and Methanol Transport in Poly (perfluorosulfonate) Membranes Containing Cs[sup+] and H[sup+] Cations. *Journal of The Electrochemical Society* 1998, 145 (11), 3798.
70. Jiang, R. Z.; Chu, D. R., Comparative studies of methanol crossover and cell performance for a DMFC. *Journal of the Electrochemical Society* 2004, 151 (1), A69-A76.
71. Cahan, B. D., AC Impedance Investigations of Proton Conduction in NAFION®™. *Journal of The Electrochemical Society* 1993, 140 (12), L185.
72. Kim, S.; Lee, H.; Ahn, D.; Woong Park, H.; Chang, T.; Lee, W., Direct sulfonation and photocrosslinking of unsaturated poly(styrene-b-butadiene-b-styrene) for proton exchange membrane of direct methanol fuel cell. *Journal of Membrane Science* 2013, 427, 85-91.
73. Kocha, S., Principles of MEA preparation. *Handbook of Fuel Cells* 2010.
74. Buonomenna, M. G.; Macchi, P.; Davoli, M.; Drioli, E., Poly(vinylidene fluoride) membranes by phase inversion: the role the casting and coagulation conditions play in their morphology, crystalline structure and properties. *European Polymer Journal* 2007, 43 (4), 1557-1572.
75. Peckham, T. J.; Schmeisser, J.; Rodgers, M.; Holdcroft, S., Main-chain, statistically sulfonated proton exchange membranes: the relationships of acid concentration and proton mobility to water content and their effect upon proton conductivity. *Journal of Materials Chemistry* 2007, 17 (30), 3255.
76. Moukheiber, E.; De Moor, G.; Flandin, L.; Bas, C., Investigation of ionomer structure through its dependence on ion exchange capacity (IEC). *Journal of Membrane Science* 2012, 389, 294-304.
77. Xu, K.; Chanthad, C.; Gadinski, M. R.; Hickner, M. A.; Wang, Q., Acid-functionalized polysilsesquioxane-NAFION® composite membranes with high proton conductivity and enhanced selectivity. *ACS Appl Mater Interfaces* 2009, 1 (11), 2573-9.
78. Lin, H. L.; Yu, T. L.; Han, F. H., A method for improving ionic conductivity of NAFION® membranes and its application to PEMFC. *Journal of Polymer Research* 2006, 13 (5), 379-385.
79. J, R.; H, P.; C, L. E. E.; J, J. U. N.; D, K. I. M.; Y, L. E. E., Crosslinked poly(vinyl alcohol) membranes containing sulfonic acid group: proton and methanol transport through membranes. *Journal of Membrane Science* 2004, 238.

What is claimed is:

1. A membrane electrode assembly comprising:
    an anode catalyst layer;
    a cathode catalyst layer; and
    a polymeric blend proton exchange membrane interposed between the anode catalyst layer and the cathode catalyst layer, the polymeric blend proton exchange membrane including a scaffold polymer and a polyacid polymer having formula I, the polyacid polymer being formed from a polyacid polymer precursor:

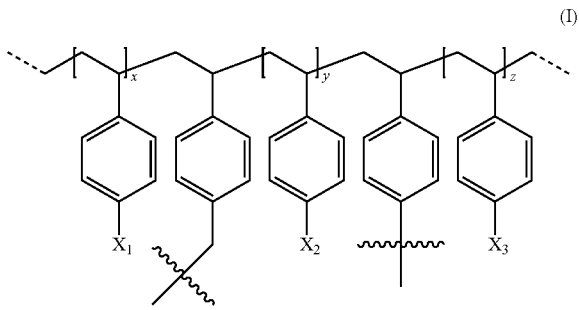

(I)

wherein:

$X_1$, $X_2$, $X_3$ are each independently a protogenic group;

x, y, z are each independently on average a number from 0 to 500;

dashed line are bonds to additional polymer segments;

wavy lines represent positions that are cross linked;

the sum of x, y, and z is greater than 3; and the scaffold polymer and the polyacid polymer precursor having matching solubility parameters.

2. The membrane electrode assembly of claim 1 wherein the scaffold polymer is selected from the group consisting of polyvinylidene chloride, polyvinylidene fluoride, poly(4-nitrostyrene), poly(2-nitrostyrene), poly(4-hydroxystyrene), poly(4-methoxystyrene), and combinations thereof.

3. The membrane electrode assembly of claim 1 wherein $X_1$, $X_2$, $X_3$ are $SO_3H$, $PO_3H_2$, or $CO_2H$.

4. The membrane electrode assembly of claim 1 wherein polyacid polymer precursor includes a salt of a protogenic group having formula $PG^{n-}M^+_n$ where $PG^{n-}$ is $SO_3^-$, $PO_3^{2-}$, and $CO_2^-$ and $M^+$ is a counterion, and n is 1 or 2.

5. The membrane electrode assembly of claim 4 wherein M+ is $NR_4^+$ and $PR_4^+$ and R is $C_{1-8}$ alkyl.

6. The membrane electrode assembly of claim 1 wherein $X_1$, $X_2$, $X_3$ are each independently $SO_3H$.

7. The membrane electrode assembly of claim 1 wherein x, y, z are each independently on average a number from 1 to 30.

8. The membrane electrode assembly of claim 1 wherein the polyacid polymer having formula I includes cross-linked polymer segments having formula (II):

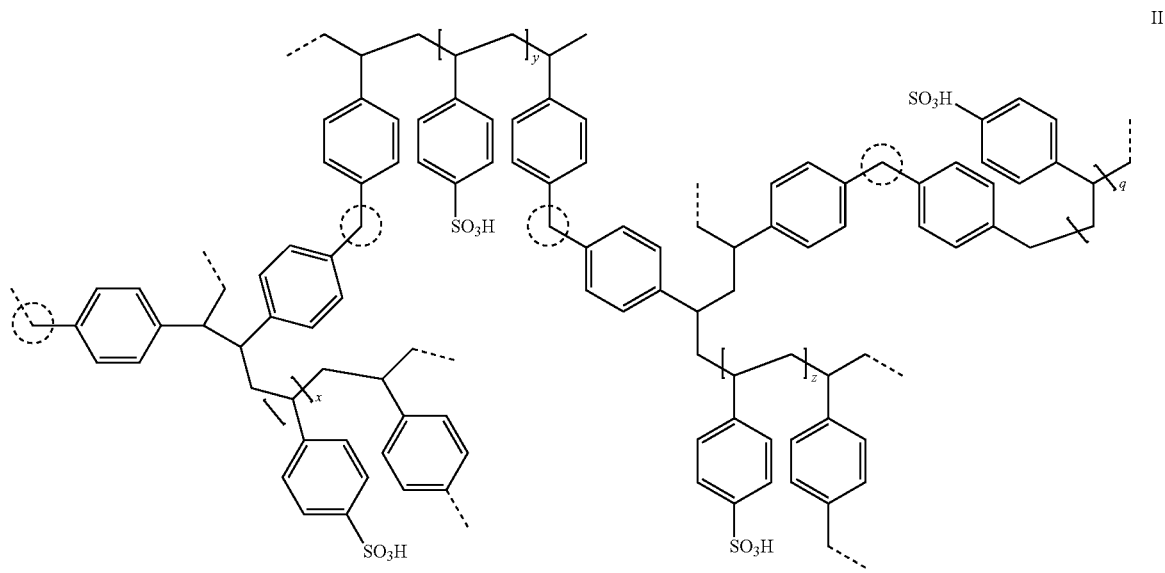

II x, y, z, q are each independently a number from 0 to 500;
dashed line are bonds to additional polymer segments; and
dashed circles are cross linked positions, wherein the sum of x, y, z, and q is greater than 3.

9. A membrane electrode assembly comprising:
an anode catalyst layer;
a cathode catalyst layer; and
a polymeric blend proton exchange membrane interposed between the anode catalyst layer and the cathode catalyst layer, the polymeric blend proton exchange membrane including a scaffold polymer and a polyacid polymer, the polyacid polymer being formed from a polyacid polymer precursor, the scaffold polymer and the polyacid polymer precursor having matching solubility parameters such that a cohesive energy density δ value of the scaffold polymer is within 40% of δ value of the polyacid precursor polymer, wherein the scaffold polymer is selected from the group consisting of polyvinylidene chloride poly(4-nitrostyrene), poly(2-nitrostyrene), poly(4-hydroxystyrene), poly(4-methoxystyrene), and combinations thereof, the polyacid polymer including a polystyrene polymer having polymer segments described by formula I:

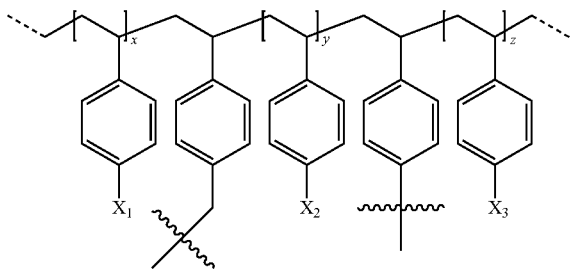

$X_1$, $X_2$, $X_3$ are each independently a protogenic group;
x, y, z are each independently on average a number from 0 to 500;
dashed line are bonds to additional polymer segments; and
wavy lines represent positions that are cross linked, wherein the sum of x, y, and z is greater than 3.

10. The membrane electrode assembly of claim 9 wherein the polymer blend proton exchange membrane includes 60 to 90 weight percent polyvinylidene and 10 to 40 weight percent of the polyacid polymer having formula (I).

11. The membrane electrode assembly of claim 9 wherein polyacid polymer includes protogenic groups selected from the group consisting of $SO_3H$, $PO_3H_2$, and $CO_2H$.

12. The membrane electrode assembly of claim 9 wherein polyacid polymer precursor includes a salt of a protogenic group having formula $PG^{n-}M^+{}_n$ where $PG^{n-}$ is $SO_3^-$, $PO_3^{2-}$, and $CO_2^-$ and $M^+$ is a counterion, and n is 1 or 2.

13. The membrane electrode assembly of claim 12 wherein M+ is $NR_4^+$ and $PR_4^+$ and R is $C_{1-8}$ alkyl.

14. The membrane electrode assembly of claim 9 wherein $X_1$, $X_2$, $X_3$ are each independently selected from the group consisting of $SO_3H$, $PO_3H_2$, and $CO_2H$.

15. The membrane electrode assembly of claim 9 wherein $X_1$, $X_2$, $X_3$ are each independently $SO_3H$.

16. The membrane electrode assembly of claim 9 wherein x, y, z are each independently on average a number from 1 to 30.

17. The membrane electrode assembly of claim 9 wherein the polystyrene polymer includes cross-linked polymer segments having formula II:

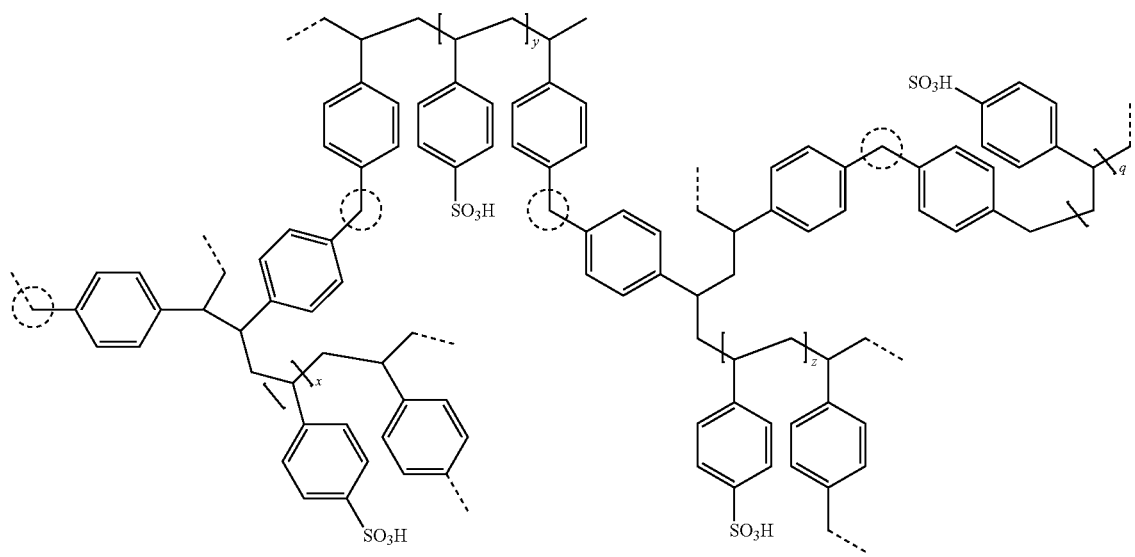

x, y, z, q are each independently a number from 0 to 500;

dashed line are bonds to additional polymer segments; and dashed circles are cross linked positions, wherein the sum of x, y, z, and q is greater than 3.

18. The membrane electrode assembly of claim 9 wherein the polymer blend proton exchange membrane includes 60 to 90 weight percent polyvinylidene and 10 to 40 weight percent polystyrene polymer.

19. A fuel cell including the membrane electrode assembly of claim 9.

* * * * *